United States Patent
Akadiri

(10) Patent No.: US 9,451,310 B2
(45) Date of Patent: *Sep. 20, 2016

(54) CONTENT DISTRIBUTION SYSTEM AND METHOD

(71) Applicant: Quantum Stream Inc., New York, NY (US)

(72) Inventor: Tayo Akadiri, Aldie, VA (US)

(73) Assignee: QUANTUM STREAM INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,443

(22) Filed: Aug. 21, 2015

(65) Prior Publication Data

US 2016/0029103 A1 Jan. 28, 2016

Related U.S. Application Data

(63) Continuation of application No. 14/727,502, filed on Jun. 1, 2015, now Pat. No. 9,117,228, which is a continuation of application No. 13/653,894, filed on Oct. 17, 2012, now Pat. No. 9,047,626, which is a
(Continued)

(51) Int. Cl.
*H04N 21/2668* (2011.01)
*H04N 21/81* (2011.01)
(Continued)

(52) U.S. Cl.
CPC ...... *H04N 21/2668* (2013.01); *G06Q 30/0269* (2013.01); *H04N 21/23424* (2013.01);
(Continued)

(58) Field of Classification Search
USPC ...................... 705/14.4, 50, 51, 57
See application file for complete search history.

(56) References Cited

U.S. PATENT DOCUMENTS

| 5,019,961 A | 5/1991 | Addesso et al. |
| 5,117,349 A | 5/1992 | Tirfing et al. |

(Continued)

FOREIGN PATENT DOCUMENTS

| EP | 0 822 535 B1 | 2/2006 |
| JP | 10-301946 A | 11/1998 |

(Continued)

OTHER PUBLICATIONS

Aggarwal, Charu C. et al., "A Framework for the Optimizing of WWW Advertising", Trends in Distributed Systems for Electronic Commerce, International IFIP/GI Working Conference TREC'98 Hamburg, Germany, Jun. 3-5, 1998 Proceedings, pp. 1-10, Springer Berlin Heidelberg, Germany.

(Continued)

*Primary Examiner* — Pierre E Elisca
(74) *Attorney, Agent, or Firm* — Michael P. Fortkort, Esq.; Michael P Fortkort PC

(57) ABSTRACT

Methods, systems, and articles of manufacture consistent with the present invention provide an electronic marketplace that matches units of content from secondary content providers with suitable vacancies from primary content providers. Vacancies may constitute, or be included in, any digital transmission containers, such as a television or radio programming, web pages, and the like. Specifically, the electronic marketplace automatically matches content offered by secondary content providers with vacancies offered by primary content providers thus filling the vacancies in these containers through a real-time content trading, placement, and distribution system. To do so, attributes associated with the vacancies and with units of secondary content are used to trade and match suitable vacancies with suitable content. This invention enables both secondary content owners and vacancy owners (primary content providers) to obtain the full commercial benefit of their secondary content and containers.

50 Claims, 16 Drawing Sheets

Related U.S. Application Data continuation of application No. 12/891,921, filed on Sep. 28, 2010, now Pat. No. 8,315,949, which is a continuation of application No. 11/355,204, filed on Feb. 16, 2006, now Pat. No. 7,831,512, which is a continuation-in-part of application No. 09/630,720, filed on Aug. 2, 2000, now abandoned, which is a continuation-in-part of application No. 09/532,048, filed on Mar. 21, 2000, now abandoned.

(60) Provisional application No. 60/155,015, filed on Sep. 21, 1999.

(51) Int. Cl.
*H04N 21/234* (2011.01)
*G06Q 30/02* (2012.01)
*H04N 21/2547* (2011.01)
*H04N 21/258* (2011.01)
*H04N 21/45* (2011.01)

(52) U.S. Cl.
CPC .... *H04N21/2547* (2013.01); *H04N 21/25883* (2013.01); *H04N 21/4532* (2013.01); *H04N 21/812* (2013.01)

(56) References Cited

U.S. PATENT DOCUMENTS

| | | | |
|---|---|---|---|
| 5,249,262 A | 9/1993 | Baule |
| 5,438,356 A | 8/1995 | Ushiki et al. |
| 5,448,625 A | 9/1995 | Lederman |
| 5,471,610 A | 11/1995 | Kawaguchi et al. |
| 5,515,098 A | 5/1996 | Carles |
| 5,537,586 A | 7/1996 | Amram et al. |
| 5,541,917 A | 7/1996 | Farris |
| 5,544,049 A | 8/1996 | Henderson et al. |
| 5,563,998 A | 10/1996 | Yaksich et al. |
| 5,563,999 A | 10/1996 | Yaksich et al. |
| 5,604,542 A | 2/1997 | Dedrick |
| 5,608,447 A | 3/1997 | Farry et al. |
| 5,635,979 A | 6/1997 | Kostreski et al. |
| 5,649,186 A | 7/1997 | Ferguson |
| 5,724,567 A | 3/1998 | Rose et al. |
| 5,734,893 A | 3/1998 | Li et al. |
| 5,740,549 A | 4/1998 | Reilly et al. |
| 5,794,210 A | 8/1998 | Goldhaber et al. |
| 5,794,237 A | 8/1998 | Gore, Jr. |
| 5,835,087 A | 11/1998 | Herz et al. |
| 5,842,199 A | 11/1998 | Miller et al. |
| 5,855,015 A | 12/1998 | Shoham |
| 5,867,799 A | 2/1999 | Lang et al. |
| 5,884,282 A | 3/1999 | Robinson |
| 5,894,554 A | 4/1999 | Lowery et al. |
| 5,895,476 A | 4/1999 | Orr et al. |
| 5,901,287 A | 5/1999 | Bull et al. |
| 5,933,811 A | 8/1999 | Angles et al. |
| 5,940,073 A | 8/1999 | Klosterman et al. |
| 5,948,061 A | 9/1999 | Merriman et al. |
| 5,963,940 A | 10/1999 | Liddy et al. |
| 5,969,717 A | 10/1999 | Ikemoto |
| 5,974,430 A | 10/1999 | Mutschler, III et al. |
| 5,974,451 A | 10/1999 | Simmons |
| 5,983,214 A | 11/1999 | Lang et al. |
| 5,987,480 A | 11/1999 | Donohue et al. |
| 5,995,943 A | 11/1999 | Bull et al. |
| 6,006,218 A | 12/1999 | Breese et al. |
| 6,006,222 A | 12/1999 | Culliss |
| 6,006,257 A | 12/1999 | Slezak |
| 6,009,409 A | 12/1999 | Adler et al. |
| 6,014,665 A | 1/2000 | Culliss |
| 6,029,141 A | 2/2000 | Bezos et al. |
| 6,029,161 A | 2/2000 | Lang et al. |
| 6,078,916 A | 6/2000 | Culliss |
| 6,128,651 A | 10/2000 | Cezar |
| 6,144,944 A | 11/2000 | Kurtzman, II et al. |
| 6,161,142 A | 12/2000 | Wolfe et al. |
| 6,182,050 B1 | 1/2001 | Ballard |
| 6,182,068 B1 | 1/2001 | Culliss |
| 6,185,558 B1 | 2/2001 | Bowman et al. |
| 6,202,058 B1 | 3/2001 | Rose et al. |
| 6,216,129 B1 | 4/2001 | Eldering |
| 6,253,189 B1 | 6/2001 | Feezell et al. |
| 6,285,987 B1 | 9/2001 | Roth et al. |
| 6,308,175 B1 | 10/2001 | Lang et al. |
| 6,314,420 B1 | 11/2001 | Lang et al. |
| 6,357,042 B2 | 3/2002 | Srinivasan et al. |
| 6,389,462 B1 | 5/2002 | Cohen et al. |
| 6,421,675 B1 | 7/2002 | Ryan et al. |
| 6,446,261 B1 | 9/2002 | Rosser |
| 6,469,753 B1 | 10/2002 | Klosterman et al. |
| 6,505,169 B1 | 1/2003 | Bhagavath et al. |
| 6,564,193 B1 | 5/2003 | Shore et al. |
| 6,570,595 B2 | 5/2003 | Porter |
| 6,622,174 B1 | 9/2003 | Ukita et al. |
| 6,687,737 B2 | 2/2004 | Landsman et al. |
| 6,697,824 B1 | 2/2004 | Bowman-Amuah |
| 6,698,020 B1 | 2/2004 | Zigmond et al. |
| 6,701,355 B1 | 3/2004 | Brandt et al. |
| 6,775,664 B2 | 8/2004 | Lang et al. |
| 6,799,326 B2 | 9/2004 | Boylan, III et al. |
| 6,810,527 B1 | 10/2004 | Conrad et al. |
| 6,973,436 B1 | 12/2005 | Shkedi |
| 7,003,792 B1 | 2/2006 | Yuen |
| 7,017,173 B1 | 3/2006 | Armstrong et al. |
| 7,031,932 B1 | 4/2006 | Lipsky et al. |
| 7,039,599 B2 | 5/2006 | Merriman et al. |
| 7,051,351 B2 | 5/2006 | Goldman et al. |
| 7,089,194 B1 | 8/2006 | Berstis et al. |
| 7,225,142 B1 | 5/2007 | Apte et al. |
| 7,308,413 B1 | 12/2007 | Tota et al. |
| 7,394,850 B1 | 7/2008 | Gordon |
| 7,421,724 B2 | 9/2008 | Klosterman et al. |
| 7,480,929 B2 | 1/2009 | Klosterman et al. |
| 7,493,641 B2 | 2/2009 | Klosterman et al. |
| 7,552,069 B2 | 6/2009 | Kepecs |
| 7,552,459 B2 | 6/2009 | Klosterman et al. |
| 7,610,597 B1 | 10/2009 | Johnson et al. |
| 7,797,712 B2 | 9/2010 | Klosterman et al. |
| 7,913,275 B2 * | 3/2011 | Hendricks ............. H04H 20/10 725/34 |
| 8,336,071 B2 | 12/2012 | Ward, III et al. |
| 8,418,195 B1 | 4/2013 | Page et al. |
| 8,527,345 B2 | 9/2013 | Rothschild et al. |
| 8,615,782 B2 | 12/2013 | Schein et al. |
| 8,646,005 B2 | 2/2014 | Klosterman et al. |
| 8,776,125 B2 | 7/2014 | Klosterman et al. |
| 8,806,538 B2 | 8/2014 | Klosterman et al. |
| 2001/0020242 A1 | 9/2001 | Gupta et al. |
| 2001/0024239 A1 | 9/2001 | Feder et al. |
| 2002/0004753 A1 | 1/2002 | Perkowski |
| 2002/0042823 A1 | 4/2002 | DeBettencourt et al. |
| 2002/0062481 A1 | 5/2002 | Slancy et al. |
| 2003/0164858 A1 | 9/2003 | Klosterman et al. |
| 2005/0100322 A1 | 5/2005 | Kikuchi et al. |
| 2005/0283796 A1 | 12/2005 | Flickinger |
| 2007/0168462 A1 | 7/2007 | Grossberg et al. |
| 2008/0127263 A1 | 5/2008 | Klosterman et al. |
| 2008/0235725 A1 | 9/2008 | Hendricks |
| 2009/0172726 A1 | 7/2009 | Vantalon et al. |
| 2011/0106283 A1 | 5/2011 | Robinson |
| 2011/0191804 A1 | 8/2011 | Klosterman et al. |
| 2012/0215624 A1* | 8/2012 | Ramer ............. G06F 17/30867 705/14.44 |
| 2012/0215635 A1* | 8/2012 | Ramer ............. G06F 17/30867 705/14.51 |
| 2012/0215639 A1* | 8/2012 | Ramer ............. G06F 17/30867 705/14.53 |
| 2013/0027429 A1 | 1/2013 | Hogg et al. |

(56) References Cited

U.S. PATENT DOCUMENTS

2013/0304604 A1 11/2013 Hoffman et al.
2014/0173431 A1 6/2014 Klosterman et al.

FOREIGN PATENT DOCUMENTS

| JP | 2001128181 A | 5/2001 |
|---|---|---|
| JP | 2001236444 A | 8/2001 |
| WO | WO 97/12486 A1 | 4/1997 |
| WO | WO 97/21183 A1 | 6/1997 |
| WO | WO 97/22074 A1 | 6/1997 |
| WO | WO9742763 A1 | 11/1997 |
| WO | WO 98/28906 A2 | 7/1998 |
| WO | WO 98/34189 A1 | 8/1998 |
| WO | WO 98/35469 A2 | 8/1998 |
| WO | WO 98/58334 A1 | 12/1998 |
| WO | WO0016544 A2 | 3/2000 |
| WO | WO0126371 A1 | 4/2001 |
| WO | WO0139514 A2 | 5/2001 |

OTHER PUBLICATIONS

Dedrick, Rick, "A Comsumption Model for Targeted Electronic Advertising", IEEE Multimedia, Summer 1995, pp. 41-49, IEEE Catalog No. 1070-986X/95.

Gallager, Katherine and Parsons, Jeffrey, "A Framework for Targeting Banner Advertising on the Internet", IEEE, 1997, pp. 265-274, IEEE Catalog No. 1060-3425/97.

Balabanovic et al., Content-Based, Collaborative Recommendation:, vol. 40 Issue 3, Mar. 1997, Communications of the ACM, pp. 66-72.

Alspector et al., "Feature-based and Clique-based User Models for Movie Selection: A Comparative Study", 1997, Journal of User Modeling and User-Adapted Interaction.

Goldberg et al., "Using Collaborative Filtering to Weave an Information Tapestry", Communications of the ACM vol. 35, No. 12, Dec. 1992, pp. 61-70.

Loeb, "Architecting Personalized Delivery of Multimedia Information", vol. 35 Issue 12, Dec. 1992, Communications of the ACM—Special issue on information filtering, pp. 39-47.

Lashkari, "Feature Guided Automated Collaborative Filtering", Sep. 1995, Submitted to the Program in Media Arts and Sciences, School of Architecture and Planning, in Partial Fulfillment of the Requirements for the degrees of Master of Science in Media Arts and Sciences, Massachusetts Institute of Technology.

Resnick et al., "Open Architecture for Collaboration Filtering of Netnews", Proceedings of the Conference on Computer Supported Cooperative Work, Chapel Hill, N.C., Oct. 1994, pp. 175-186.

Persin, Michael, "Document Filtering for Fast Ranking", Proceeding of the Seventeenth Annual International ACM-SI-GIR Conference on Research and Development in Information Retrieval, Jul. 6, 1994, pp. 339-348.

Knowles, "Software Bots filter Web data; Agent Technology Delivers Customized Information for BBN's PIN", PC Week v.12, n17, May 1995, pp. 112-113.

Evans et al., "A Summary of the Clarit Project", Technical Report, Laboratory for Computational Linguistics, Carnegie-Mellon University, Nov. 1991, pp. 1-12.

Fischer et al., "Information Access in Complex, Poorly Structured Information Spaces", Human Factors in Computing Systems, CHI '91 Conference Proceedings, ACM, 1991, 8 pp.

Sheth, "Learning Approach to Personalized Information Filtering", Massachusetts Institute of Technology, (Feb. 1994), pp. 1-74.

Dumais et al., "Using Latent Semantic Analysis to Improve Access to Textual Information", In Proceedings of CHI-88 Conference on Human Factors in Computing Systems, (1998, New York: ACM), 6 pp.

Brassil, J., et al., "Program Insertion in Real-Time IP Multicasts", Newsletter ACM SIGCOMM Computer Communication Review, vol. 29, Issue 2, Apr. 1999 (pp. 49-68).

Gupta, Amit et al.: "Ad insertion at Proxies to Improve Cache Hit Rates", In Proceedings of the 4th International Web Caching Workshop, Apr. 1999 (7 pgs.).

Kohda, Youji, et al.: "ubiquitous Advertising on the WWW: Merging Advertisement on the Browser," Fifth International World Wide Web Conference, May 6-10, 1996, Paris, France. (pp. 1-9).

Langheinrich, Marc, et al.: "Unintrusive Customization Techniques for Web Advertising", in WWW '99: Proceeding of the Eighth International Conference on World Wide Web, May 1999, pp. 1259-1272.

Rensink, Alexander, "Solutions for DVB-T Systems", SMPTE Conf. Proc. 1999, Jul. 14, 1999, pp. 79-87.

Van Tassel, Joan, "Special Report: Digital Ad Insertion", Broadcasting & Cable; Apr. 14, 1997; 127, 16; ProQuest Central, p. 72-76.

Brightman, Joan, "Ad Insertion System to Boost CATV Revenue", Telephony; Feb. 13, 1995; 228, 7; ProQuest Central, p. 26.

Dreze, Xavier et al. "Internet Advertising: The Medium is the Difference", Consumption Markets and Culture, vol. 4(1), 2000, 23-37. 22 pages.

* cited by examiner

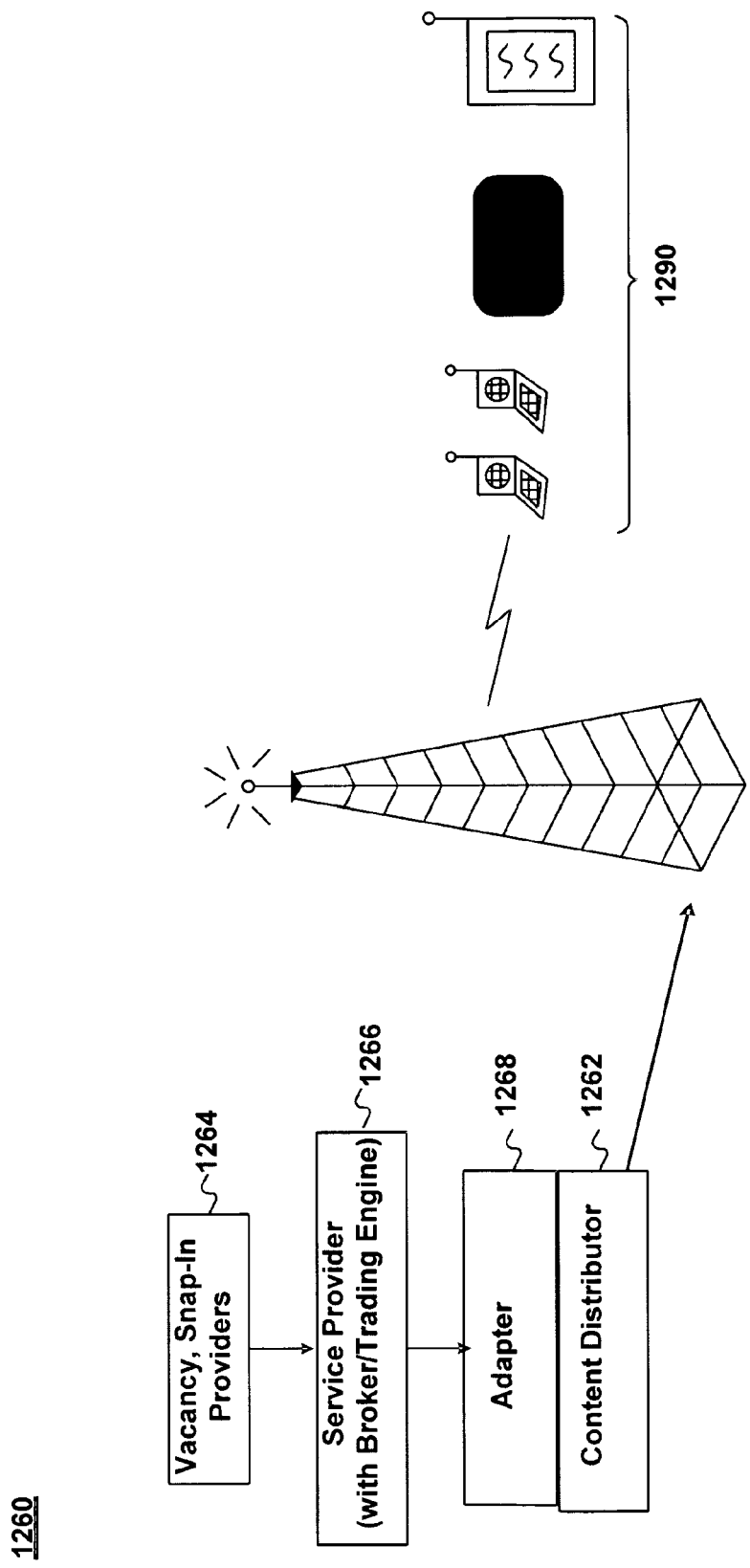

CONTENT DISTRIBUTION SYSTEM AND METHOD

RELATED APPLICATIONS

This application is related to U.S. patent application Ser. No. 13/937,822 filed Jul. 9, 2013; U.S. patent application Ser. No. 13/937,843 also filed Jul. 9, 2013 (now U.S. Pat. No. 8,650,125 issued Feb. 11, 2014); U.S. patent application Ser. No. 13/971,392 filed Aug. 20, 2013 (now U.S. Pat. No. 8,682,794 issued Mar. 25, 2014); and Ser. No. 13/971,434 filed Aug. 20, 2013 (now U.S. Pat. No. 8,688,582 issued Apr. 1, 2014). This application claims priority to and is a continuation of U.S. patent application Ser. No. 14/727,502 filed Jun. 1, 2015 (now U.S. Pat. No. 9,117,228 issued Aug. 25, 2015), which is a continuation of U.S. patent application Ser. No. 13/653,894 entitled the same and filed on Oct. 17, 2012 (now U.S. Pat. No. 9,047,626 issued Jun. 2, 2015), which is a continuation of U.S. patent application Ser. No. 12/891,921 entitled the same and filed on Sep. 28, 2010 (now U.S. Pat. No. 8,315,949 issued on Nov. 20, 2012), which is a continuation of U.S. patent application Ser. No. 11/355,204 entitled the same and filed on Feb. 16, 2006 (now U.S. Pat. No. 7,831,512 issued on Nov. 9, 2010), which is a continuation-in-part of U.S. patent application Ser. No. 09/630,720 filed on Aug. 2, 2000, which is a continuation-in-part of U.S. patent application Ser. No. 09/532,048 filed on Mar. 21, 2000, which relies upon and claims priority to U.S. Provisional Application No. 60/155,015 filed Sep. 21, 1999. U.S. patent application Ser. No. 09/630,720 also relies upon and claims priority to U.S. Provisional Application No. 60/155,015. All provisional and non-provisional applications listed above are hereby incorporated by reference herein in their entirety.

BACKGROUND OF THE INVENTION

A. Field of the Invention

The invention relates generally to content distribution systems and, more particularly, to a system for distributing digital content associated with a container based on a relationship between attributes associated with the digital content and attributes associated with a defined region of the container. The container may constitute, or be included in, any digital transmission, such as a television or radio programming, web pages, and the like.

B. Description of the Related Art

Content generally comprises any kind of text, audible message, and/or visual. Today, content is reduced to bits and bytes for transmission and visual and/or audible output. Content finds its way into our homes via output devices such as televisions (with or without set-top boxes), radios, computer networks (e.g., the Internet), and the like. Content also makes its way into our everyday routine via portable output devices such as pagers, personal digital assistants (PDAs), wireless telephones (e.g. cellular or satellite), and the like.

Generally, content is provided to these output devices based on arrangements made long before the transmission from a source to the output devices. For example, primary content providers such as television stations, radio stations, publishers on the Internet, Internet Service Providers, pager service companies, and other entities that provide a medium or network for transmitting content to an audience enter into agreements with content providers, such as advertisers, to transmit units of content, such as advertisements at predetermined times, intervals, locations, etc. to all or specific devices.

But transmission of content-units is not limited to advertisements. Other types of content providers also prearrange for the transmission or airing of their content. For example, entities that produce programs (secondary content) for television enter into agreements with television stations and networks (primary content providers) to transmit specific programs at predetermined times. The same is true for the other forms of entertainment, edutainment, and communication described above.

Providers of primary and secondary content merge their content before delivery to the consumer. These arrangements are often negotiated long before delivery to the consumer and through a labor intensive process. Therefore, at the time of transmission the predetermined cost to the content providers does not necessarily reflect the current level or interest in the secondary or primary content at the time of transmission. For example, a primary content provider may experience an unexpected surge in interest in a particular program at a particular time but the provider may not be able to reap the financial benefit of the additional interest by, for example, charging secondary content providers, such as advertisers accordingly for advertising during the surge. Moreover, prearranged arrangements may prevent certain advertisers and producers from competing effectively for transmission time from the primary content provider.

For example, the barriers for publishing content on the Internet are low. A computer equipped with a communication mechanism such as a modem and telephone connection is nearly all that is necessary to gain access to the Internet. A program called a web browser, such as the NETSCAPE NAVIGATOR from NETSCAPE Corporation, makes it a simple task to traverse the vast network of information available on the Internet and, specifically, its subpart known as the "World Wide Web."

The architecture of the web follows a conventional client-server model. The term "client" and "server" are used to refer to a computer's general role as a requester of data (the client) or provider of data (the server). In conventional settings, a web browser resides in each client and is used to access specially formatted "web pages" that reside on Internet (web) servers. Web clients and web servers communicate using a conventional protocol called "HyperText Transfer Protocol" (HTTP).

In operation, a web browser opens a connection to a web server and initiates a request for a document using a Uniform Resource Locator (URL). The web server delivers the requested document, typically in a standard coded format such as the "HyperText Markup Language" (HTML) format. After the document is delivered, the connection is closed. The web browser renders the document, displaying content or performing a function designated by the document. In this way, tile web server publishes content.

With the explosive growth of e-commerce, the Internet is poised to realize its potential as a revolutionary way for businesses to interact with their customers and each other. This potential is evident with the growth of c-commerce as applied to certain business fields such as retailing, advertising, and content syndication. Certain known business methods, and conventional implementations of these methods allow for deployment of each of these fields on the Internet and for primary or secondary content providers to earn revenue for participating in this market. However, these fields remain artificially disjointed and monolithic in their deployment.

Therefore, there is a need for a system that can combine the diverse area of commerce into a single universally accessible system to all content providers. Such a system not only permits digital content providers to explicitly target consumers and medium, but also it permits primary content providers, such as web publishers, cellular service providers, and broadcasters, or secondary content providers to maximize their revenues for part of their medium.

SUMMARY OF THE INVENTION

Methods, systems, and articles of manufacture consistent with embodiments of the present invention overcome the shortcomings of existing systems, for example, by providing a means for creating (within content of any digital medium) designated regions ("vacancies") which are reserved to be filled by other secondary digital content, by providing a means for creating units of content which can fill the vacancies, and by providing an automated broker that responds to real-time notifications of vacancies that need content, selects appropriate units of content for each vacancy, and transmits in real-time the content unit information to fill each vacancy. Both the vacancies and the content units that fill them have attributes that may be used to determine how and when a vacancy will be filled by a unit of content, or how and when a unit of content can be used. The automated broker may use marketplace (trading) mechanisms to determine the matching and selection of content, A vacancy may be included in any digital medium such as digital video or digital audio, web pages, email and the like, Correspondingly, the unit of content that fills a vacancy can constitute any digital medium.

At different times, a single vacancy may be filled with a variety of types of different content from any source. Conversely, a single vacancy in content that is distributed to multiple consumers may be filled with different content for each consumer at the same time—thus making the vacancy also a method for seamlessly assembling multi-sourced, mix-and-match content, on-the-fly.

Trading and placing content units within vacancies for content enables both primary content owners and secondary content owners to obtain the full commercial and consumer benefit of their content.

In an implementation consistent with an embodiment the present invention a method for creating vacancies within content is provided. A vacancy is a designated region within digital content which is reserved to be filled by other (secondary) digital content. Each vacancy has attributes that can be used to determine how and when that vacancy will be filled by secondary content. At different times, a single vacancy may be filled with a variety of types of different content from any source—thus making the vacancy also a method for assembling on-the-fly, mix-and-match content.

In another implementation consistent with the present invention a method for creating a modular unit of digital content (a "snap-in") is provided. For example, a snap-in may be as simple as a graphic image, or as complex as a complete view of an email in-box, or a digital audio public message, or a digital video advertisement. The term "snap-in" connotes that it can fit into a vacancy. Each snap-in has attributes that describe it fully, and that can be used to determine how and when that snap-in will be used.

In another implementation consistent with the present invention a method for creating a content broker that matches and selects snap-ins for vacancies is provided. The broker may be server software that runs on a service provider's computers. The broker may include software that manages a database of information about available snap-ins and vacancies. The broker also includes software that can respond in real-time to notifications of content vacancies that need to be filled, The broker includes software that can compare the attributes of a vacancy with available snap-ins, and that can apply market mechanisms (trading) in the course of selecting a content snap-in for a vacancy. The broker can track the use of vacancies and the use of snap-ins. The broker also includes software that can distribute or transmit a snap-in to each vacancy to be filled.

In another implementation consistent with an embodiment of the present invention, a method is provided for notifying a broker (or service provider) in real-time of a vacancy opening that needs to be filled with content. The notification may be transmitted across a network such as the Internet, and may include vacancy information, such as the attributes of the open vacancy, and other information including data on the consumer of the digital content that contains the vacancy.

In another implementation consistent with an embodiment of the present invention, a method for merging a snap-in's content into the reserved region designated by a vacancy in digital content is provided. This merging may occur in real-time. This merging will provide the end consumer of content that contained vacancies with a seamless and personalizable experience of final content that may have been assembled on-the-fly from multiple units of content from multiple sources.

Systems and articles of manufacture corresponding to these implementations are also provided within the scope of the present invention.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings:

FIG. 12 depicts an alternative content distribution system suitable for practicing methods and systems consistent with the present invention.

DETAILED DESCRIPTION

Figure 1A:
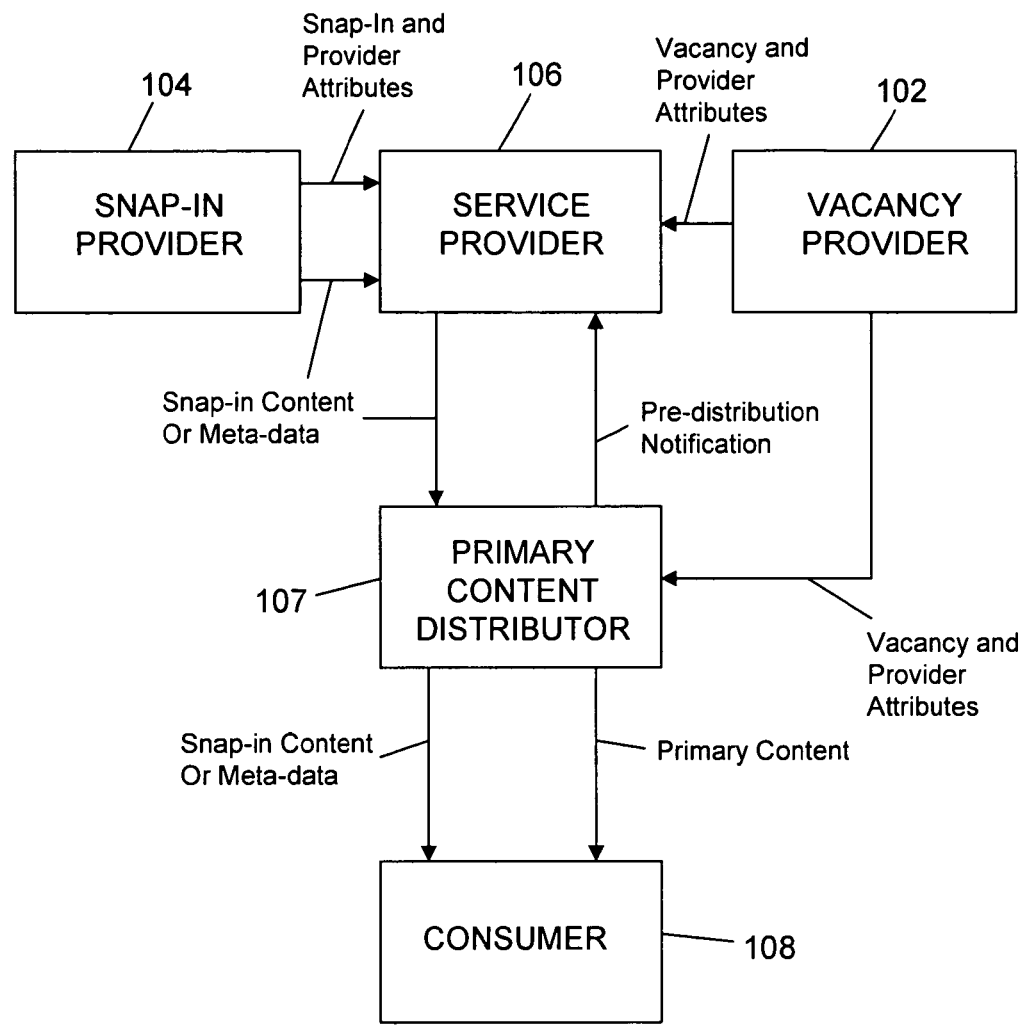
FIG. 1A depicts a content trading, placement, and distribution system, according to an embodiment of the present invention.

The following detailed description of the invention refers to the accompanying drawings. Although the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Overview:

Methods, systems, and articles of manufacture consistent with an embodiment of the present invention provide a marketplace and distribution mechanism that matches and trades units of content and containers of content, using attributes associated with the content units and containers, and merges matched content within the matched containers. Such methods, systems, and articles enable primary content providers to make available and fill these containers in real time using a content trading and placement process facilitated by the marketplace. This enables web publishers, information providers, and broadcasters to receive content for their containers in real time and obtain value-based returns for permitting secondary content providers to fill these containers with content. Similarly, this marketplace approach enables content providers to define units of content and distribute them in real time into suitable containers, and to obtain value-based returns for permitting web publishers, information providers, and broadcasters to use these units of content.

Vacancies are spatial or temporal regions that may constitute or be included in content containers. A vacancy is a place reserved to hold a unit of content created by a content provider. In one example, a container such as a web page, may contain vacancies in the form of spatially defined regions within the web page. In another example, a container such as an audio program may contain vacancies in the form of temporally defined regions designated for embedding units of second-party content, such as advertising or public service announcements. In yet another example a container, such as a text message intended for devices, such as pagers, cellular phones, or PDAs, may contain a vacancy in the form of a region designated for a unit of embedded data sourced from a secondary content provider, such as personalized news, sports, or advertising.

A consumer may receive the container as a primary content stream. Any vacancies in the container are open to accept suitable content from a suitable secondary content provider. The marketplace may locate a suitable secondary content provider whose content stream is transmitted to the consumer within any designated portions (vacancies) within the primary content stream.

A vacancy is a region owned by a vacancy provider that can be used for any suitable use by any secondary content provider for any number of use-units (e.g., impressions) at any monetary price (or in exchange for any other instrument of value within the marketplace). A vacancy provider may be a web publisher, broadcaster, information providers, or any other entity that makes vacancies available to secondary content providers. A vacancy provider may allocate permanent or temporary occupancy to secondary digital content providers based on content/context suitability and pricing considerations that are negotiated by the marketplace. In other words, the vacancy provider may dictate the type of content needed for allocated regions within the vacancy provider's medium. The suitability, pricing matching is negotiated in a marketplace based on the vacancy attributes that the vacancy provider attaches to the vacancy and attributes that a secondary content provider attaches to a particular unit of content.

Vacancy providers create vacancies with attributes, such as dynamic attributes and static attributes. These attributes identify each vacancy by type, methods, systems, and articles of manufacture consistent with an embodiment of the present invention provide a marketplace and distribution mechanism that matches and trades units of content and containers of content, using attributes associated with the content units and containers, and merges matched content within the matched containers. Such methods, systems, and articles enable primary content providers to make available and fill these containers in real time using a content trading and placement process facilitated by the marketplace. This enables web publishers, information providers, and broadcasters to receive content for their containers in real time and obtain value-based returns for permitting secondary content providers to fill these containers with content. Similarly, this marketplace approach enables content providers to define units of content and distribute them in real time into suitable containers, and to obtain value-based returns for permitting web publishers, information providers, and broadcasters to use these units of content.

Vacancies are spatial or temporal regions that may constitute or be included in content containers. A vacancy is a place reserved to hold a unit of content created by a content provider. In one example, a container such as a web page, may contain vacancies in the form of spatially defined regions within the web page. In another example, a container such as an audio program may contain vacancies in the form of temporally defined regions designated for embedding units of second-party content, such as advertising or public service announcements. In yet another example a container, such as a text message intended for devices, such as pagers, cellular phones, or PDAs, may contain a vacancy in the form of a region designated for a unit of embedded data sourced from a secondary content provider, such as personalized news, sports, or advertising.

A consumer may receive the container as a primary content stream. Any vacancies in the container are open to accept suitable content from a suitable secondary content provider. The marketplace may locate a suitable secondary content provider whose content stream is transmitted to the consumer within any designated portions (vacancies) within the primary content stream and the suitable secondary content to fill the vacancy. Static attributes may include required secondary content type (such as teenage advertising, sales opportunity, syndicated news, an audio stream), the physical size and location of the vacancy, time and date qualifications for the vacancy, or classification of the vacancy. Dynamic attributes are defined as attributes that can change or be derived at any time, or attributes that are evaluated just-in-time as the vacancy is offered. Depending on the medium, dynamic attributes may contain any combination of changing information—for example, about the specific consumer, the content environment, or previous consumer interactions with the content environment. Different media may offer different mechanisms for transmitting dynamic attributes along with other vacancy information. As an example, in the case of a web publisher, a vacancy may include dynamic attributes, such as real time web site traffic. When traffic is low at the web site, the cost to fill the vacancy may be four cents per impression, however when web traffic is high, the cost may be six cents per impression. Another type of dynamic attribute is keywords. For example, the value of a keyword entered by a consumer during a search request may be provided via HTTP as a dynamic attribute of a vacancy and used to help locate suitable secondary content for that vacancy which will appear with the search-results content. That is, if a consumer enters the keyword "car," in a search web page, content relating to cars may be used to fill the vacancy located on the search-results web page. Advertisers may compete for such keyword-based placement opportunities via a real-time automated auction. Another example of a dynamic attribute is consumer demographics.

A "snap-in" comprises a unit of digital content and or content meta-data, with associated attributes. The name derives from the idea that these content units can be merged, or "snapped into" placement opportunities (vacancies) within primary content, based on matching. Some examples of types of snap-in include context-sensitive advertising, syndicated content, or "virtual storefronts." Virtual storefronts are defined as any content with which the consumer can interact to purchase goods or services. An example of a virtual storefront would be a World-Wide-Web bookshop's HTML listing of 5 books on sale, which can be embedded within a suitable web page, and whose book topics can dynamically match the ambient content of that web page. The attributes of a snap-in can also be static or dynamic attributes. Static attributes may relate to the content provider, nature of content, etc. Dynamic attributes are attributes that are evaluated "just-in-time" (as the snap-in is being delivered to a specific vacancy opportunity) in order to customize the snap-in for that specific vacancy opportunity. An example of this would be a keyword attribute on a bookstore snap-in that would enable the book listing content to match the consumer. Providers of digital content units, also known as snap-in providers, create snap-ins that may be plugged into vacancies. A snap-in provider interested in placing snap-ins may set the attributes for each snap-in to target or match suitable vacancies. The broker, or marketplace, fills vacancies with snap-ins by matching and trading them based on the attributes of both the snap-ins and the vacancies.

The invention comprises a number of components, such as host software, adapter software, a service provider, vacancy editor software and snap-in editor software. Vacancy editor enables vacancy providers to create vacancies and define attributes for those vacancies. Host software transmits and receives, in real time, information about a vacancy with the service provider. Depending on the medium or content type, host software can reside on the consumer computer or the primary content distributor's computer. Adapter software, if necessary for the type of content and environment, merges snap-in content into vacancies within content containers. Depending on the medium or content type, host software can reside on the consumer computer or the primary content distributor's computer. The service provider facilitates the process of filling vacancies with snap-ins by providing a real-time content matching, trading, placement, and distribution system. A snap-in editor enables a secondary digital content provider to define a unit of content and its attributes. A vacancy editor enables a primary digital content provider to define a secondary-content placement opportunity within container content, and the attributes of that placement opportunity. Depending on the content type and medium, snap-in editors and vacancy editors can be as simple as a text editor, or can be more user-friendly software. For example, in the World-Wide-Web, vacancies may be defined using XML tags embedded within a simple HTML page, or with Javascript used to create placement opportunities. In a similar way—depending on the content type and medium—adapter or host software can be in the form of medium-specific features such as Javascript in the World Wide Web.

One of the many applications of the marketplace is in the field of advertising. The marketplace system provides a number of benefits over traditional advertising systems. First, the marketplace enables digital content providers to dynamically seek the most favorable placement opportunities based on real-time data. Digital content providers can create robust campaigns that match digital content in real-time to any targeted criteria, including full consumer profiles, contextual content, and search keywords. Using the marketplace, digital content is placed in real time on any suitable medium that draws a mass audience finding the best audience hour-by-hour, or even minute-by-minute, as traffic or consumers change.

Second, the marketplace enables vacancy providers to set up any number of single-or-multi-purpose precisely-defined placement opportunities within their container content. These vacancies are then automatically filled with a suitable snap-in. The vacancy contains attributes that give the vacancy provider complete control over the digital content that appears in their content's vacancies. Because placement opportunity in these vacancies may be traded using real-time auctions, vacancy providers achieve maximum value from their minute-to-minute audience.

Third, the marketplace provides a real-time electronic marketplace for trading in digital real estate (vacancies and snap-ins). Software agents can mediate the trading of vacancies and snap-ins. Automated real-time auction mechanisms in the service provider can enable digital content owners to maximize digital asset value without user intervention. Software configured with participant's preferences can act as marketplace agents that enable a snap-in provider or a vacancy provider to achieve a desired result.

Figure 1B:
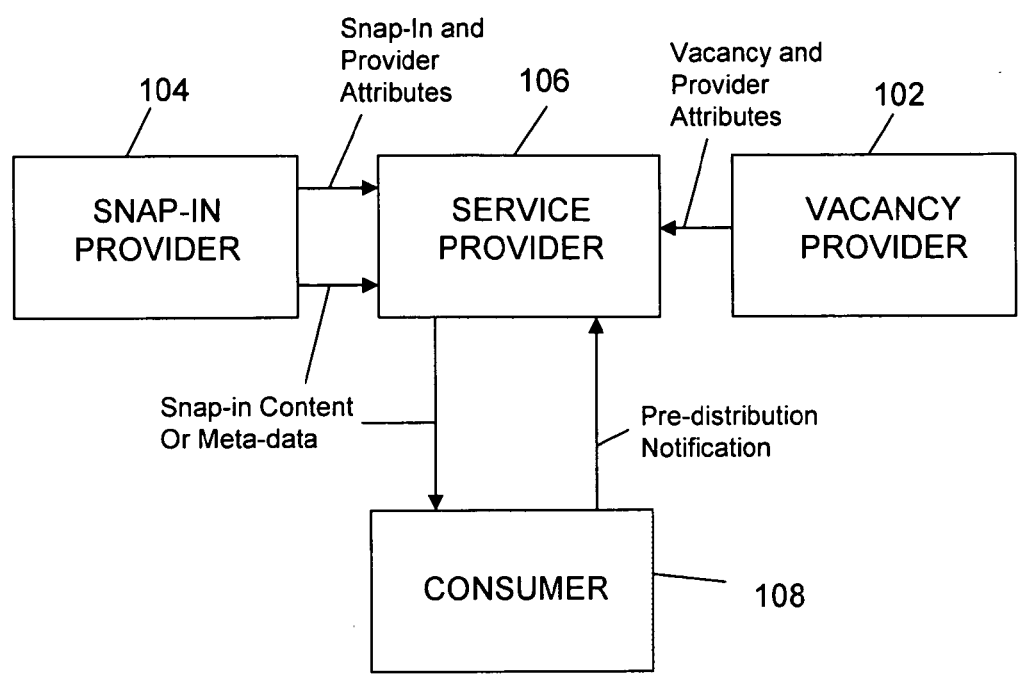
FIG. 1B depicts a content trading, placement and distribution system, according to another embodiment of the present invention.

FIG. 1A depicts a content trading, placement, and distribution system 100 suitable for practicing methods and systems consistent with the present invention. Distribution system 100 comprises a vacancy provider 102, a snap-in provider 104, a service provider 106, a Primary Content Distributor 107, and a consumer 108. Vacancy provider 102 creates vacancies, information about which is transmitted to service provider 106 either statically (before distribution) by vacancy editor, or dynamically (in real-time at distribution) by host software. Again, a vacancy may comprise or be included in a web page, audio video stream, or any other digital content. The vacancy information transmitted to service provider 106 includes the vacancy attributes. Snap-in provider 104 creates snap-ins (content or meta-content and attributes) and provides snap-in information to service provider 106. Like the vacancy, a snap-in may be inserted in a web page, audio/video stream, or any other digital content. When a consumer 108 requests, or is an intended recipient of, content containing a vacancy from a primary content distributor 107, primary content distributor 107 transmits pre-distribution notification to service provider 106, service provider 106 matches a suitable snap-in with the vacancy in real-time, then service provider 106 sends snap-in content or meta-content to primary content distributor 107, and primary content distributor 107 sends primary content and snap-in content or meta-content to consumer 108 to be embedded within the vacancy region. Alternatively, as shown in FIG. 1B, the consumer 108 host software sends pre-distribution notification to service provider 106, then service provider 106 sends snap-in content or meta-content to consumer 108 host software to be embedded within the vacancy region.

Figure 2:
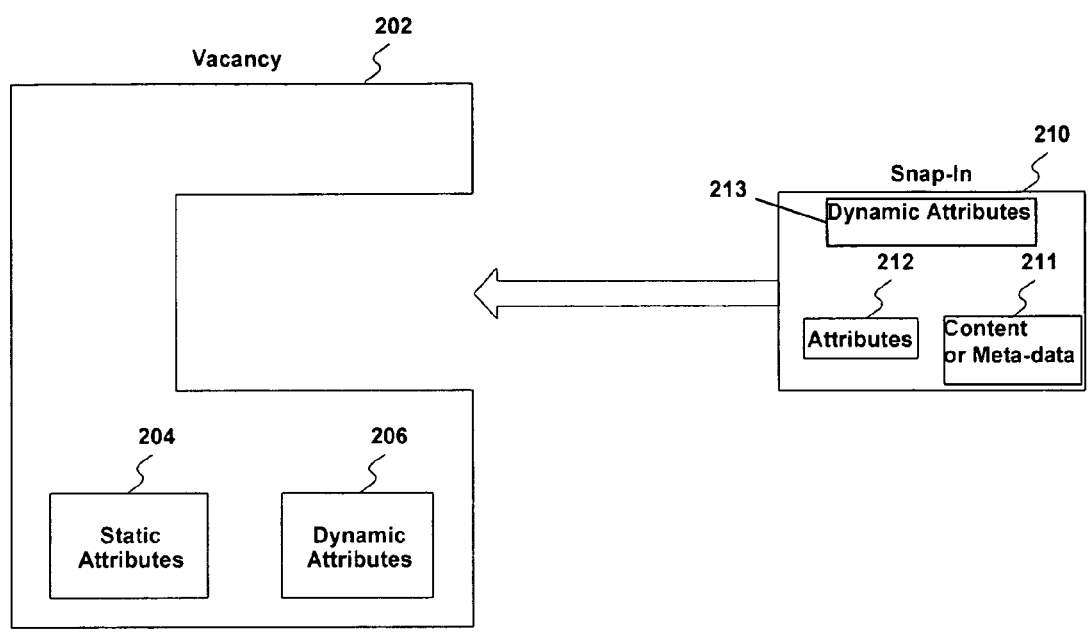
FIG. 2 depicts an exemplary vacancy and snap-in, according to an embodiment of the present invention.

FIG. 2 depicts an exemplary vacancy and snap-in consistent with the principles of the present invention. Vacancy 202 is created by vacancy provider 102 using a vacancy editor. Depending upon the implementation and configuration of distribution system 100, the vacancy editor may be configured differently. For example, in the case of web pages, a vacancy editor may be a well-known WYSIWYG page-editing program with a vacancy editor program plug-in. In a different implementation, a vacancy editor may be an audio editor for streams, or a PCS editor that includes text content intended for broadcasts. Also in all implementations, vacancies can be defined using markup language such as XML embedded with the primary content, or as metadata of the primary content. Associated with vacancy 202 are static attributes 204 and dynamic attributes 206. Each time a consumer 108 is distributed content that contains vacancy 202, primary content distributor 107 transmits the vacancy attributes 204, 206 to service provider 106, either by direct means built into primary content distributor 107's software or by host software that handles or processes the information requested from primary content distributor 107.

A snap-in 210 is created by a snap-in editor software, such as a web-based interface or other interface, consisting of software that prompts the user to enter metadata to the snap-in content, or the snap-in content or meta-data 211 itself, as well as the snap-in's associated attributes 212 and dynamic attributes 213. The snap-in editor software may be remotely located at service provider 106. In that case, the snap-in editor software may be a web wizard program that helps a user create snap-ins using the web. Depending upon implementation and configuration of distribution system 100, the snap-in editor program may be configured differently. In a different implementation, such as for broadcast or PCS applications, the snap-in editor software may contain content information and attributes suitable for that application. Snap-in 210 is designed to fill vacancy 202 and contains attributes 212 to help in matching a vacancy in real-time.

System Components

Figure 3:
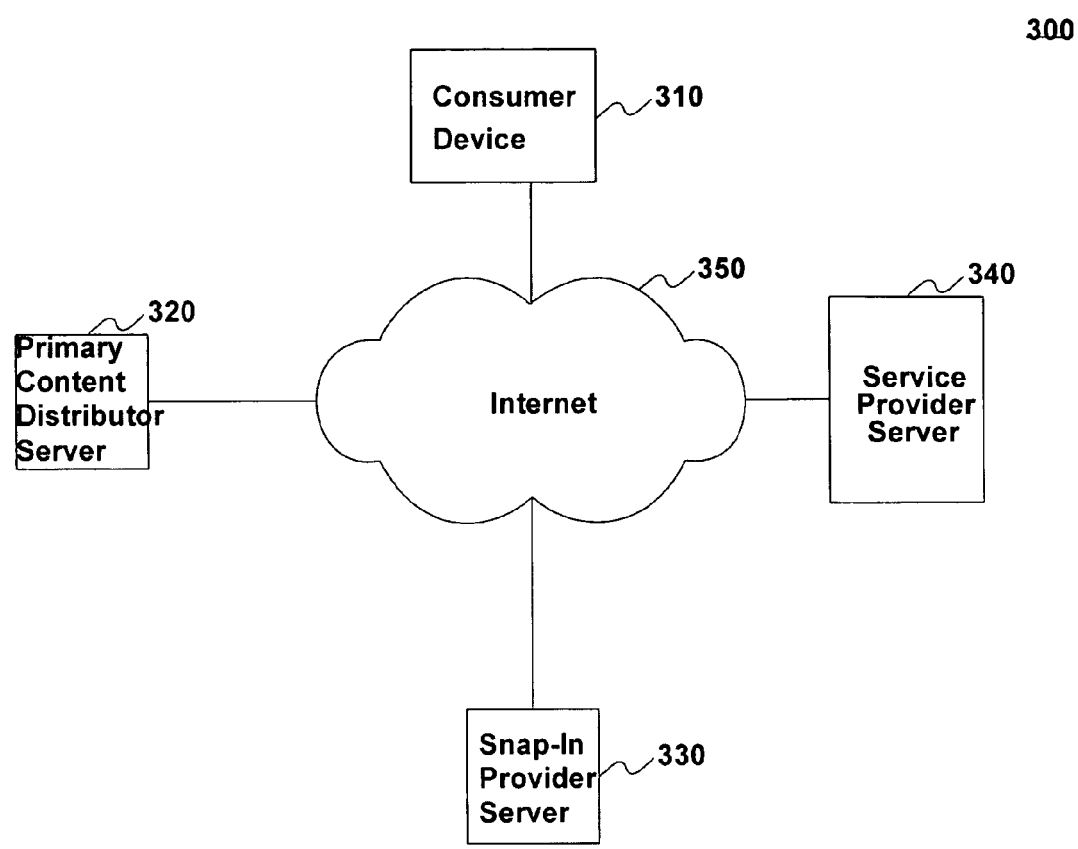
FIG. 3 depicts an exemplary content distribution system suitable for practicing methods and systems, according to an embodiment of the present invention.

FIG. 3 depicts an exemplary data processing system 300 suitable for practicing methods and systems consistent with the present invention. Distribution system 300 comprises a consumer device 310, a primary content distributor server 320, and a snap-in provider server 330 connected to a service provider server 340 via a network 350, such as the Internet. A consumer uses device 310 to request and submit information to primary content distributor server 320. A digital content provider, such as an advertiser or a "virtual storefront" owner, uses service provider server 340 to create and submit snap-ins to service provider 340. In another implementation, the digital content provider may use local software, so that snap-in provider server 330 transmits snap-ins to service provider 340. A vacancy provider (such as a web publisher) uses service provider server 340 to create and submit vacancies to service provider server 340. In another implementation, the vacancy provider may use local software to create and transmit vacancies to service provider server 340.

Figure 4:
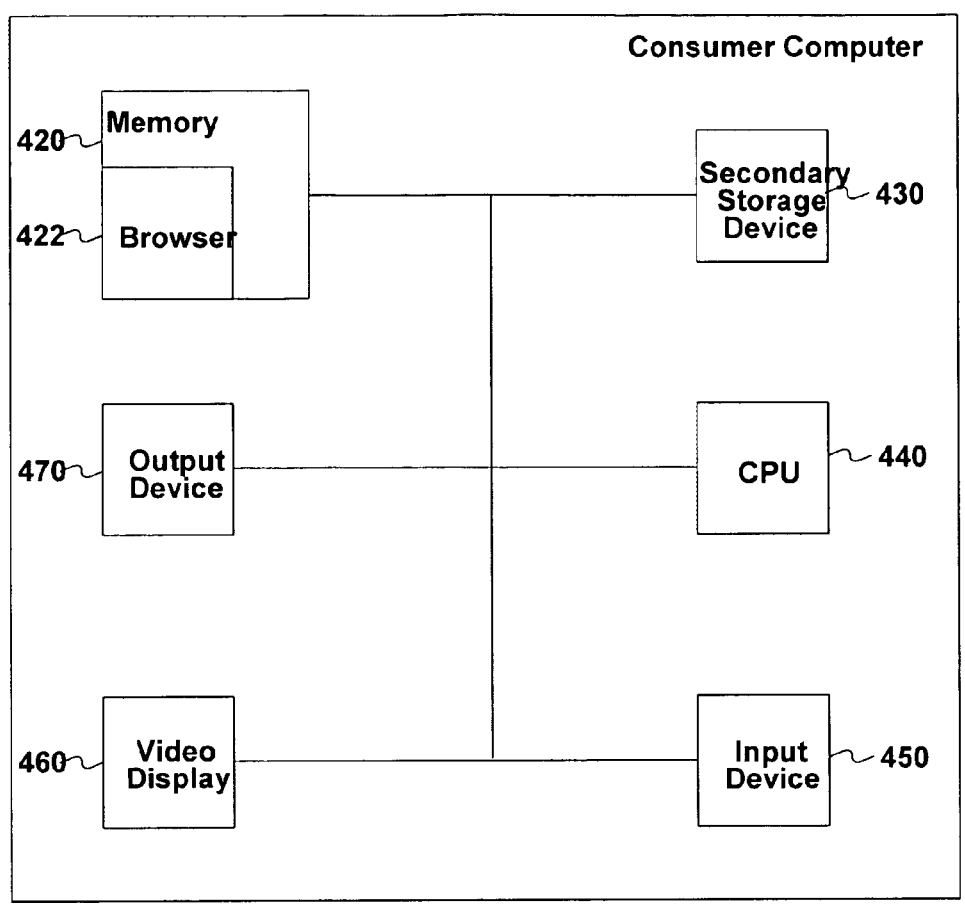
FIG. 4 depicts a more detailed diagram of the consumer computer depicted in FIG. 3.

FIG. 4 depicts a more detailed diagram of consumer computer 310, which contains a memory 420, a secondary storage device 430, a central processing unit (CPU) 440, an input device 450, a video display 460, and an output device 470. Memory 420 includes browser 422 that allows consumer to interact with primary content distributor servers 320 by transmitting and receiving data, such as web pages. A web page may include images or textual information using hypertext markup language (HTML), Java or other techniques. An example of browsers suitable for use with methods and systems consistent with the present invention are the Netscape Navigator browser, from Netscape Communications Corp., and the Internet Explorer browser, from Microsoft Corporation.

Figure 5A:
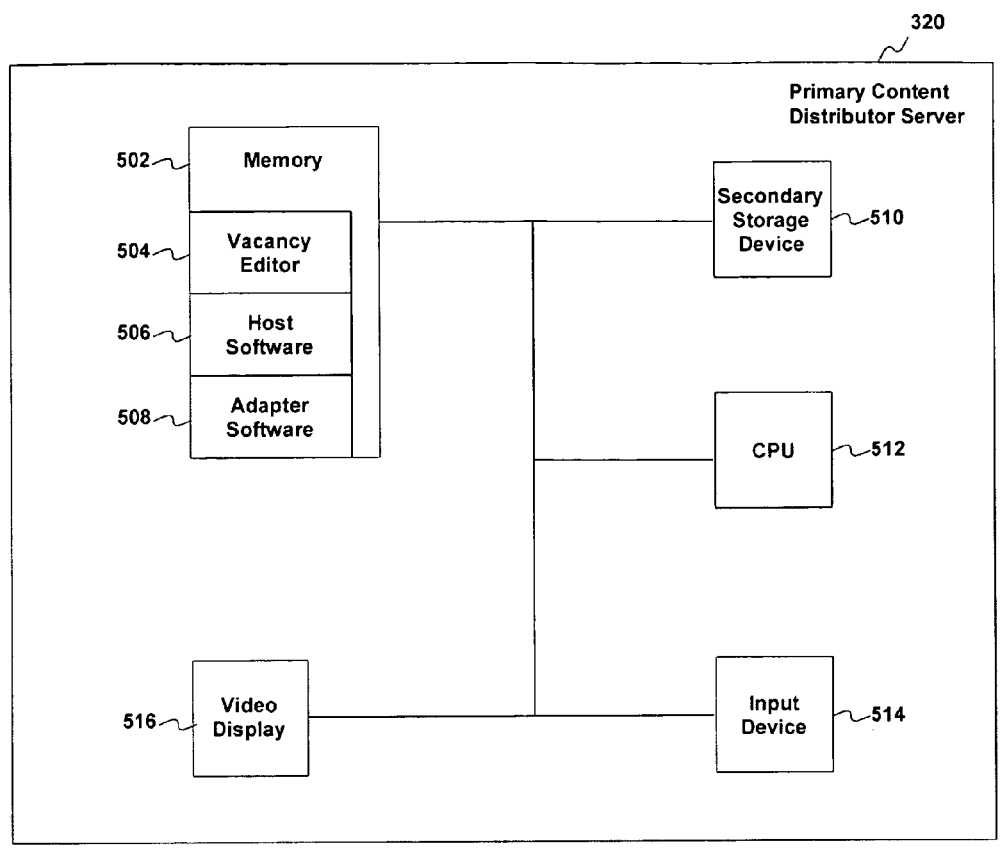
FIG. 5A depicts a more detailed diagram of the primary content distribution server depicted in FIG. 3.

As shown in FIG. 5A, primary content distributor server 320 includes a memory 502, a secondary storage device 510, a CPU 512, an input device 514, and a video display 516. Memory 502 includes host software 506, and adapter software 508. Optionally, it may include vacancy editor software 504, vacancy editor 504 enables primary content providers to create vacancies for their containers. Host software 506 transmits information associated with vacancies to a service provider server 340 each time a consumer computer 310 requests a container that contains a vacancy 202. Host software 506 broadcasts information corresponding to the vacancy, such as vacancy attributes 204, 206 to service provider 340. In a web environment, a web software, such as the APACHE web software, may also be included in host software 506 to transmit and receive web pages. Adapter software 508 merges content with vacancies as the content is delivered to host software 506 from either snap-in provider server 330 or service provider server 340.

One potential configuration involves an in-process web server extension or filter that cooperates with the host web server to perform the adapter functions described above. In an alternative configuration, the adapter and host software resides on a separate (proxy) server. The proxy server is configured to intercept all requests to web server by, for example, listening on port 80, which is the port that web requests typically come in and on which the web server is usually listening. The web server is therefore configured to listen on a different port, such as port 81. In one configuration, both the web server and the proxy server processes are implemented on a single computer, although they may be distributed on different machines. The proxy server is also configured to forward incoming requests to the web sever for a response. After the web server returns a response to the proxy server, the adapter and host software on the proxy performs the functions described above.

Figure 5B:
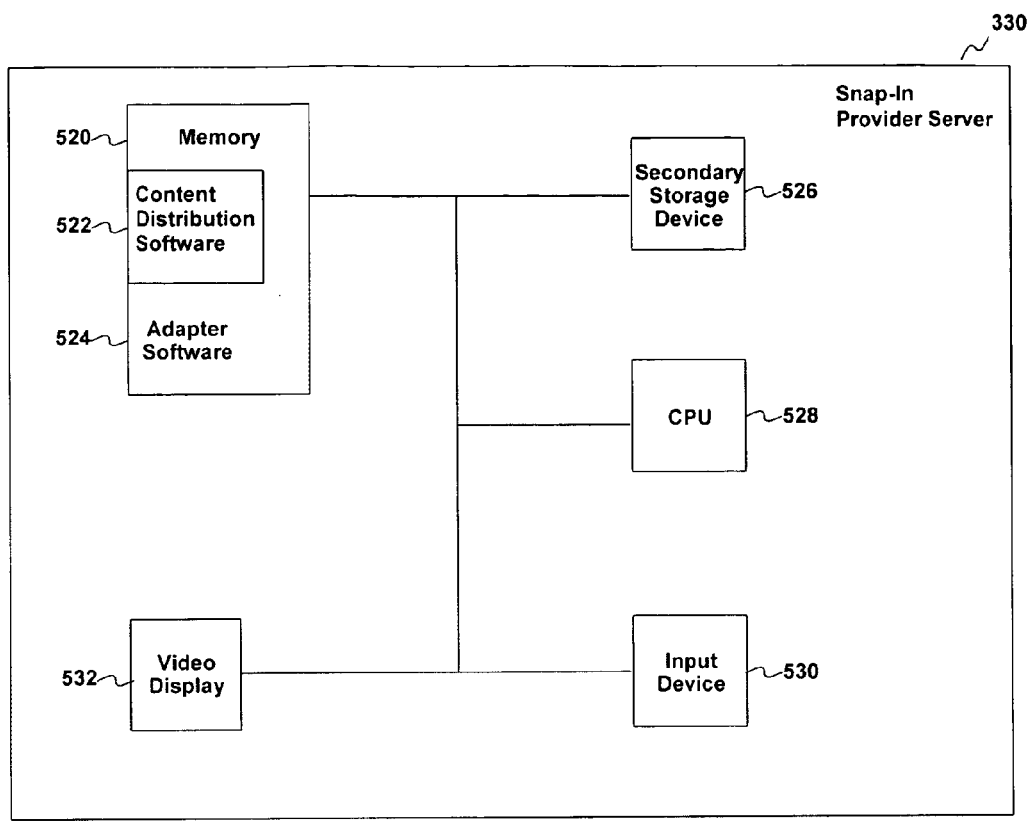
FIG. 5B depicts a more detailed diagram of the snap-in provider server depicted in FIG. 3.

As shown in FIG. 5B, snap-in provider server 330 includes a memory 520, a secondary storage decide 526, a CPU 528, and input device 530, and a video display 532. Memory 520 includes snap-in content distribution software 522 and adapter software 524. Snap-in provider software 522 communicates with service provider server 340 and may include web software. Adapter software 524 records consumer follow-through activity. For example, when a consumer connects to snap-in provider server 330 associated with the snap-in, snap-in provider software 522 may notify service provider server 340 of the consumer's selections and activity.

Figure 5C:
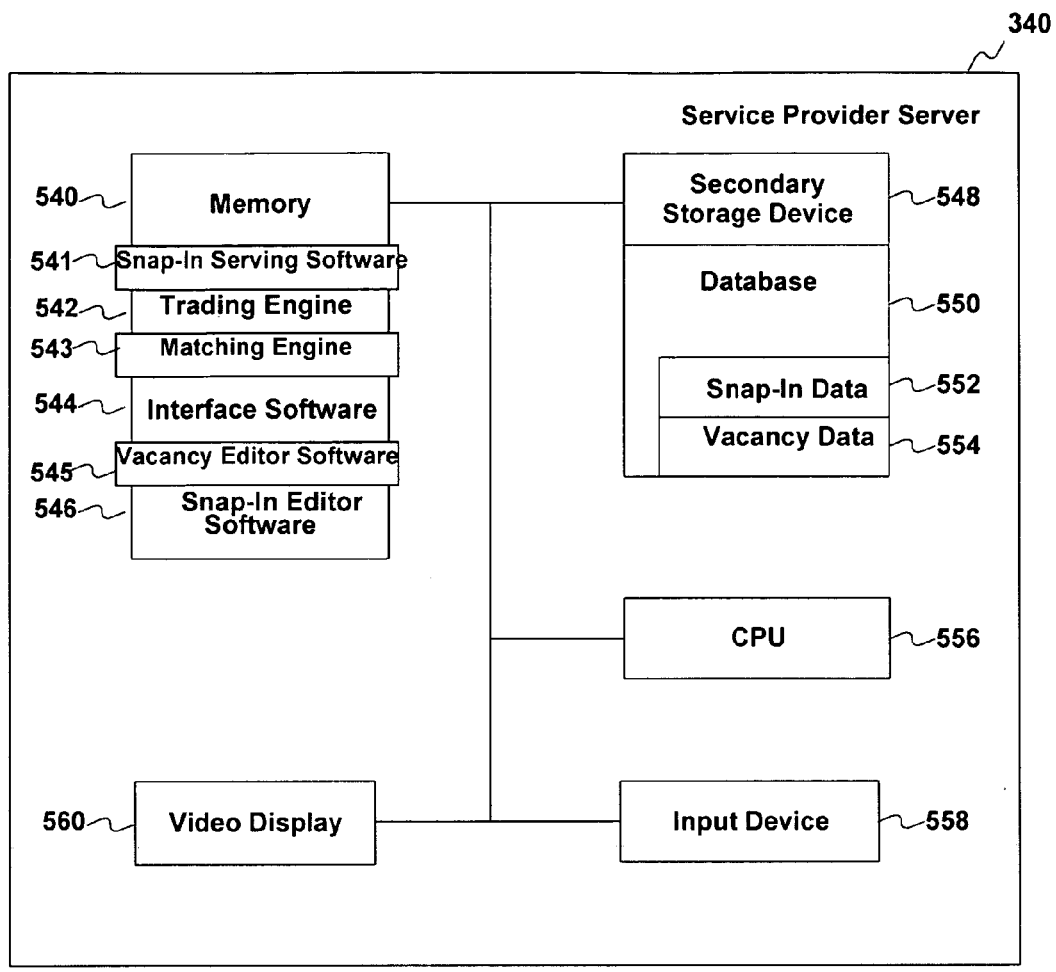
FIG. 5C depicts a more detailed diagram of the service provider server depicted n FIG. 3.

As shown in FIG. 5C, service provider server 340 includes a memory 540, a secondary storage device 548, a CPU 556, an input device 558, and a video display 560. Memory 540 stores snap-in serving software 541, trading engine 542, matching engine 543, interface software 544, vacancy editor software 545, and a snap-in editor software 546. The snap-in serving software 541 resides in memory 540, receives requests for snap-ins and delivers snap-ins for matching with a vacancy. Trading engine 542 provides a virtual trading floor where vacancies are filled with snap-ins based on any snap-in's attributes and vacancy attributes. Matching engine 543 receives notifications of a vacancy along with attributes of the vacancy. Matching engine 543 searches the snap-ins and identifies snap-ins that match the attributes of the vacancy. If there are a plurality of snap-ins that match the vacancy, a financial competition takes place. The financial competition is managed by trading engine 542. Hence, the trading engine 542 is able to trade, auction vacancies and snap-ins. Interface software 544 provides access to various features of the service provider, including trading, preferences, and configuration features. Interface software 544 may be a web page, Application Program Interfaces (API), or other input interface. An API is a set of routines, protocols, or tools for communicating with software applications. APIs provide efficient access to trading engine 542 without the need for additional software to interface with the engine. Vacancy editor software 545 allows a user to define a vacancy without the user having to know a programming language (for example, without having to know how to program in HTML) to create the vacancy. Snap-in editor software 546 helps a secondary content provider create and deliver snap-ins to a service provider 340 (e.g., a web interface). One skilled in the art will appreciate that snap-in editor software 546 may be located at snap-in provider server 330.

Secondary storage device 548 contains a database 550 that includes a snap-in data 552 and a vacancy data 554. Snap-in data 552 holds information relating to snap-ins, such as attributes indicated by secondary content providers. Vacancy data 554 holds information relating to various vacancies, such as static attributes and dynamic attributes.

Vacancy Creation Process

Figure 6A:
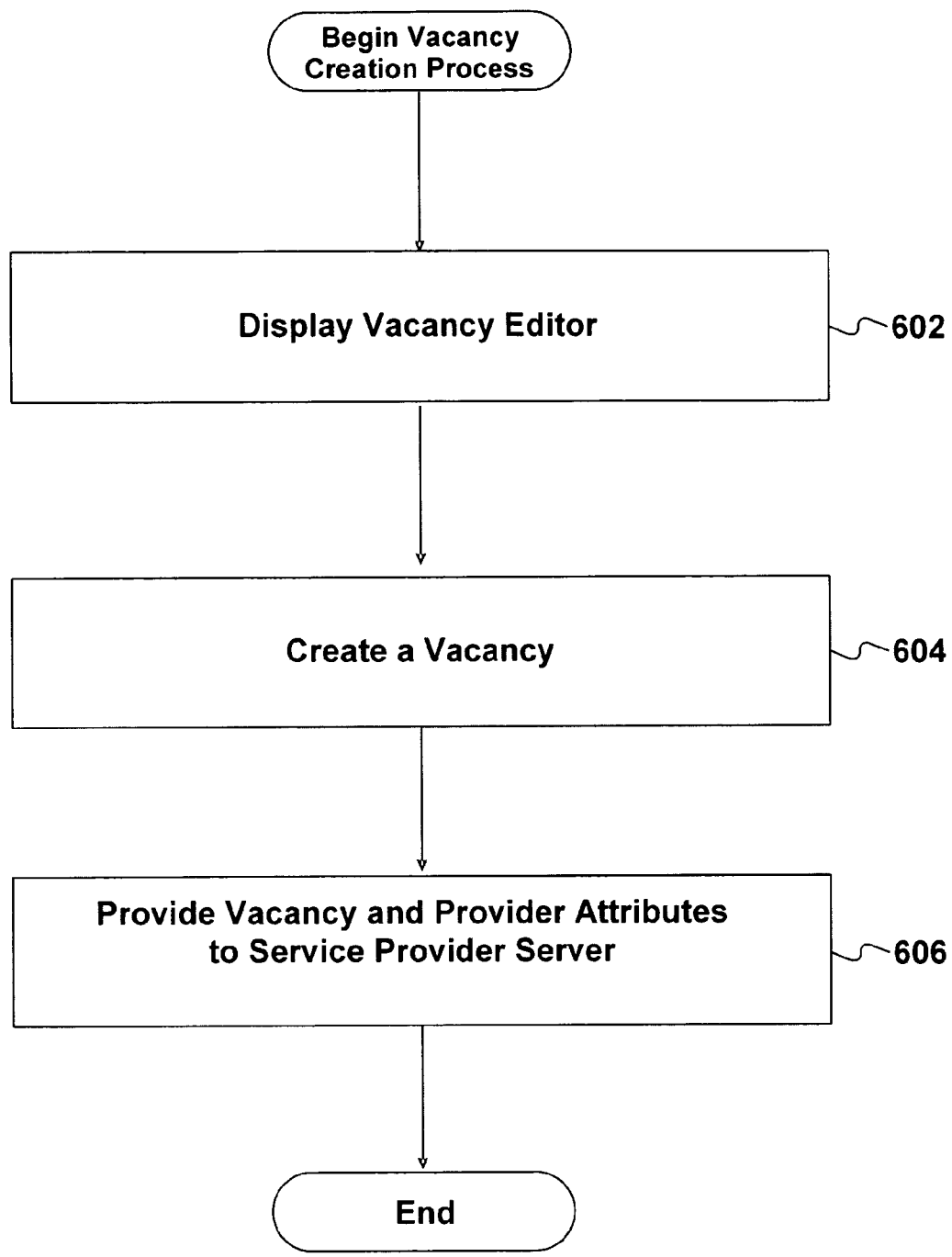
FIGS. 6A and 6B each depicts a flow chart of the steps performed when creating a vacancy, according to an embodiment of the present invention.
Figure 6B:
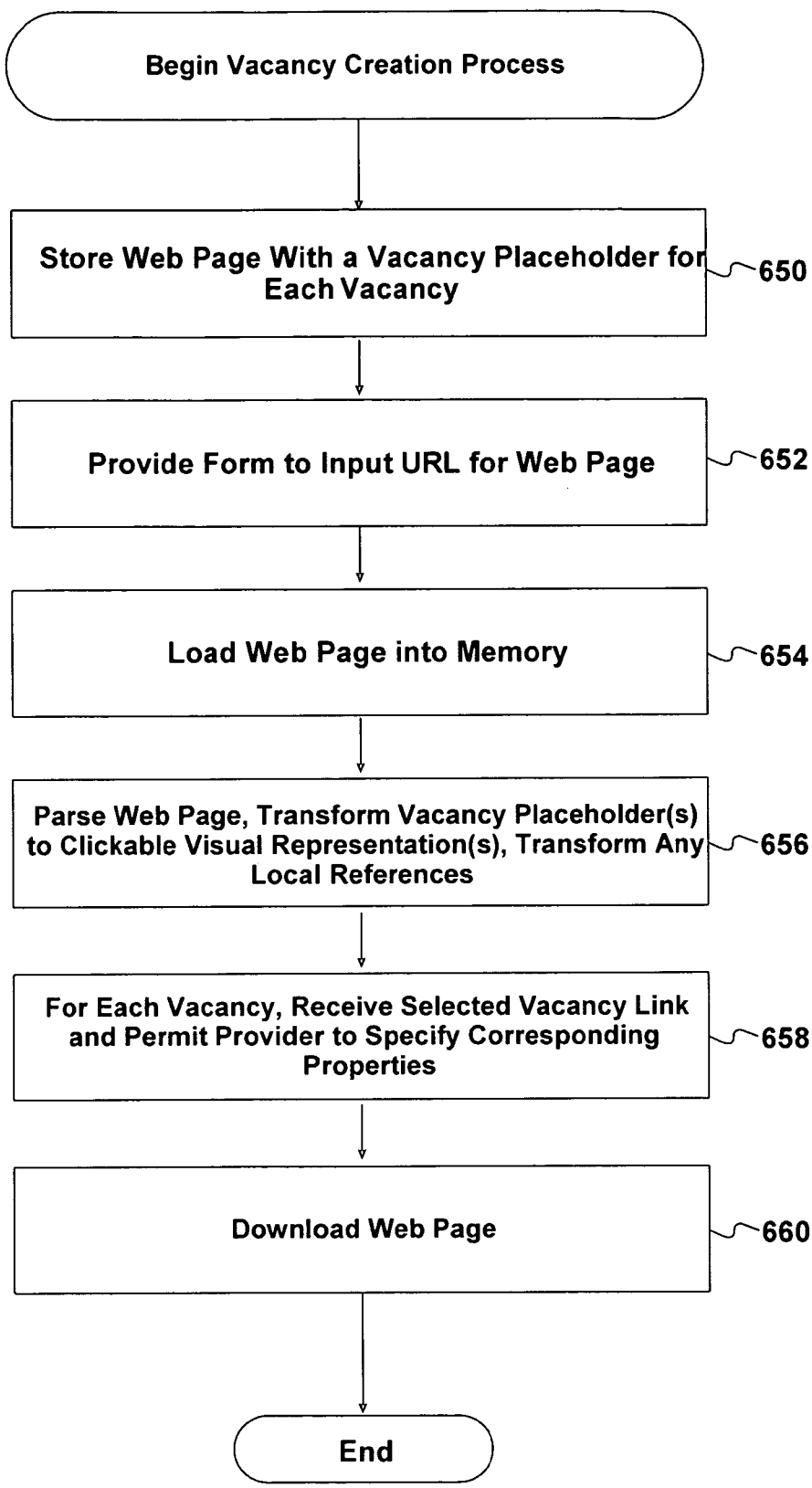
Figure 10:
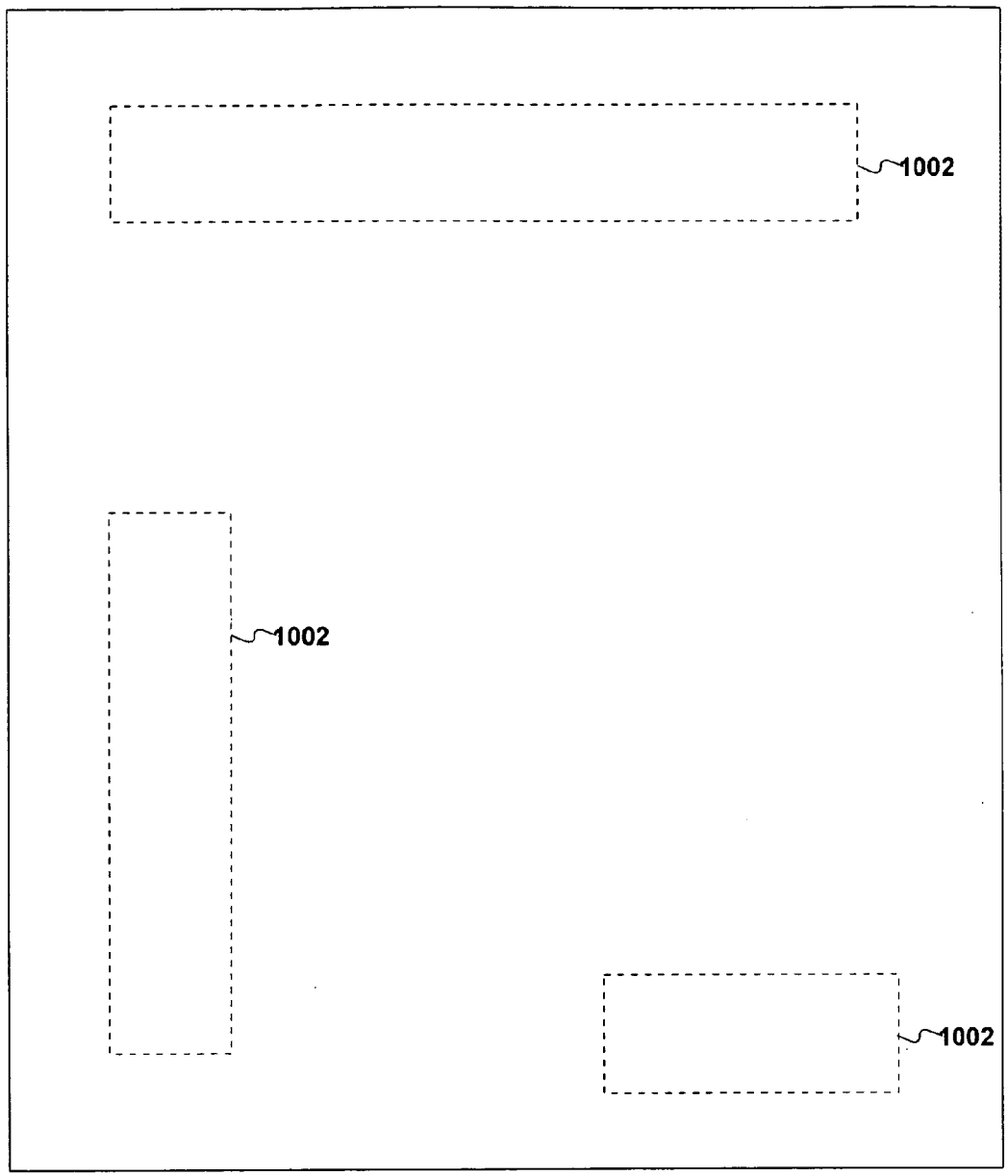
FIG. 10 depicts an exemplary web page for use, according to an embodiment of the present invention.

As shown in FIG. 6A, vacancy creation process is initiated, for example, by displaying a vacancy editor software 504 (step 602). For example, a web publisher may use vacancy editor software 504 to graphically define a vacancy within web pages. An exemplary web page 1000 with a vacancy is depicted in FIG. 10. Web page 1000 contains vacancies 1002.

Next, a primary content provider may create a vacancy for a container located at host server 320 (step 604). For example, a web publisher may define and link a vacancy region 1002 to web page 1000. Finally, the vacancy attributes associated with vacancy 1002 and the provider attributes are provided to interface software 544 on service provider server 340 (step 606). The vacancy attributes are stored in host file 554 and are accessible to digital content providers for viewing. The attributes are also used during the trading process described below. That is, the attributes indicate the suitability or desirability of vacancy 1002 to any particular buyer. A vacancy will be matched to suitable second-party content through its attributes, and will have a value in the marketplace based on its attributes. As consumers request vacancy-containing content from host server 320, the vacancy attributes are transmitted through host software 506 to service provider 340. In addition, periodically, vacancy attributes may be updated as traffic conditions change at host server 320. For example, when web traffic increases at host server 320, host software 506 notifies interface software 544 of the increase.

Snap-in Creation Process

Figure 7:
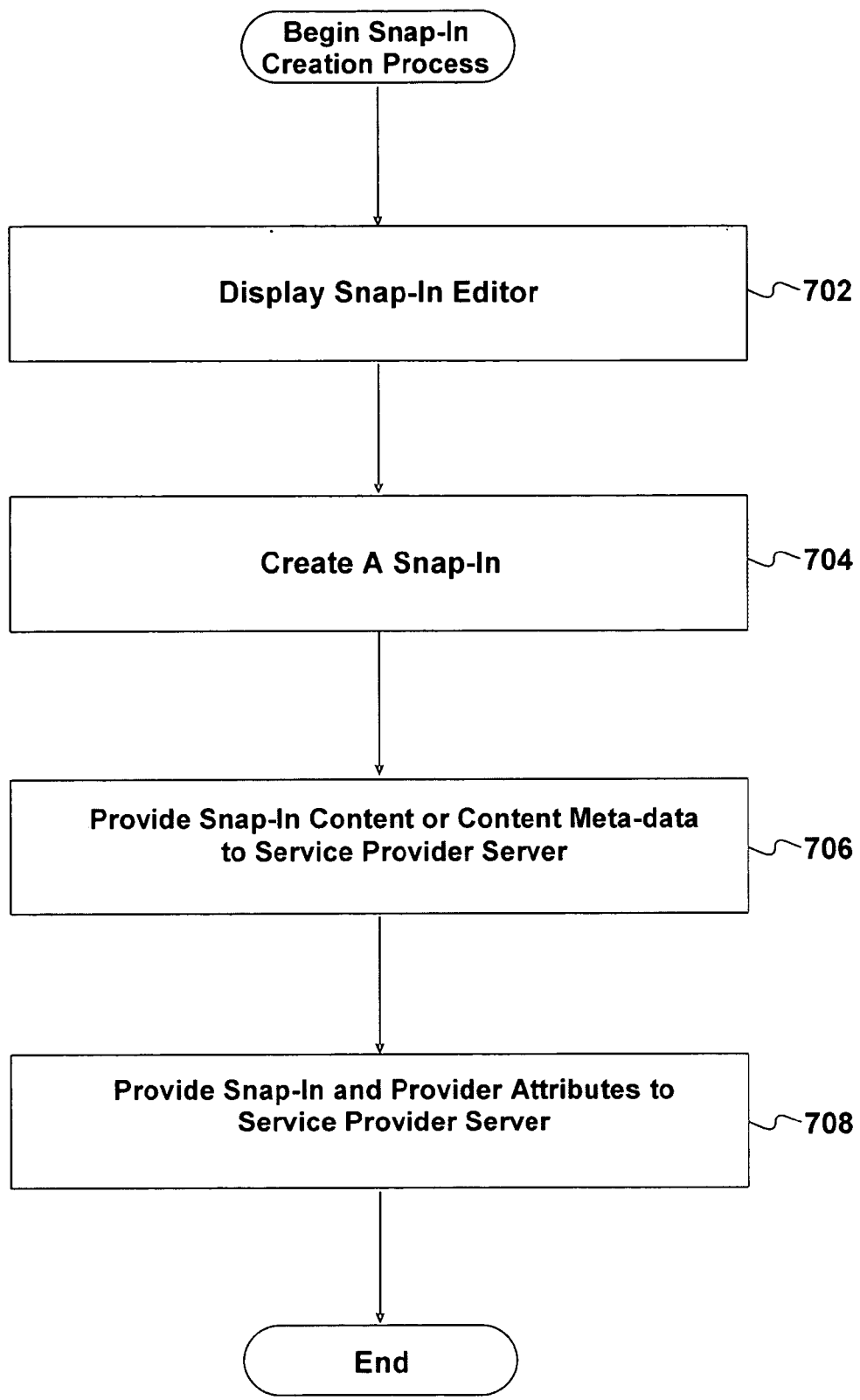
FIG. 7 depicts a flow chart of the steps performed when creating a snap-in, according to an embodiment of the present invention.

As shown in FIG. 7, snap-in creation process is initiated by accessing snap-in editor software 546 (e.g., web wizard software) located on service provider server 340 (step 702). A secondary content provider may access the service provider's web page through interface 544. Once accessed, the secondary content provider may use the web wizard software to create a snap-in (step 704). Each snap-in contains attributes as well as digital content. For example, a snap-in may contain a strategy embodied in a software agent that executes the secondary content provider's bidding/trading strategy for a particular vacancy or vacancy attribute. The software agents may be created to bid aggressively under some conditions or less aggressively for others. For example, the software agent may be defined to bid high when the primary content of the vacancy will be displayed to a large audience, or when the vacancy will be displayed to a target audience, such as teenagers. Software agents may adjust their bids based on dynamic property values of current vacancies. For example, a software agent may contain a comprehensive policy profile, such as targeting or excluding specific vacancy attributes, measuring complex web-consumer demographics, or even bid for a vacancy when specific individuals are involved. Once skilled in the art will appreciate that a vacancy may contain similar strategies as the snap-ins. In one implementation the snap-in may be implemented as an object and the associated software agent is implemented in the object's methods. For example, in an embodiment of the present invention, defining a snap-in may include defining an algorithm in a conventional or proprietary computer language to assemble specialized content dynamically and to render the content into an appropriate format for its destination medium (e.g., a vacancy).

Next, the secondary content provider may provide the snap-in content or content meta-data to a service provider server 340 (step 706). That is, the provider may create, link, or upload content associated with the snap-in to a service provider server 340. The secondary content provider may use snap-in editor software 546 to upload the information to service provider server 340 using interface 544. Finally, attributes associated with the snap-in and provider attributes may be provided to service provider server 340 (step 708). The attributes may be stored in snap-in provider file 552.

Request Process

Figure 8:
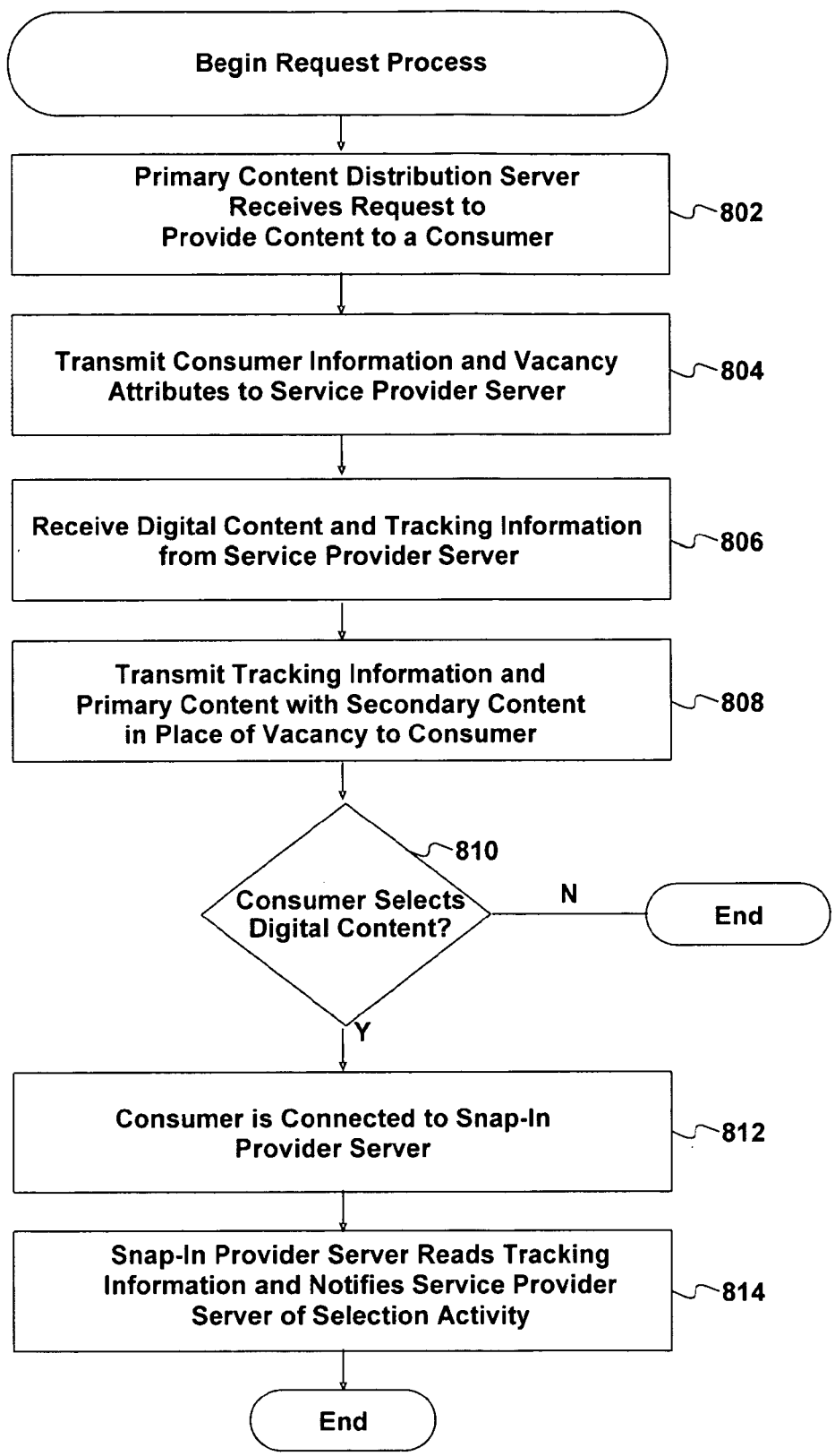
FIG. 8 depicts a flow chart of the steps performed by the service provider server when trading vacancies and snap-ins, according to an embodiment of the present invention.

As shown in FIG. 8, request process is initiated by receiving a request to provide content to a consumer (step 802). For example, a request may be for a web page. Each time browser 422 requests content that contains a vacancy from host server 320, host software 504 transmits information corresponding to the requesting consumer, various vacancy attributes, and any other attributes (e.g., web server attributes) to service provider server 340 (step 804). The vacancy may be designated for content such as paid or syndicated content. In instances where the vacancy is sold, this information is called a "vacancy offering." For example, host software 504 may transmit any available demographic information regarding the consumer, such as age, physical location, or software. Host software 504 may obtain demographic information by the requesting consumer's network address and domain name. Host software 504 may also obtain demographics information from a profile created for each consumer. That is, host software 504 may require the consumer to login to host server 320 to obtain web pages from host server 320. Host software may also transmit dynamic vacancy attributes, such as required content, physical attributes, and cost per impression. Additionally, host software 504 may transmit web server attributes, such as rating information, or number of viewers. Once the vacancy offering is received at service provider server 340, the vacancy is matched with a suitable snap-in in accordance to trading preferences of snap-in providers and vacancies; the transaction is executed.

Next, host server 320 receives the digital content and tracking information form the selected snap-in from interface software 544 (step 806). Once received, adapter software 508 merges the content with the vacancy and transmits the snap-in content with digital content and transaction information in place of the vacancy to the requesting consumer (step 808). The digital content may be clickable and contain links to a snap-in provider location, along with various tracking information (described below). For example, the digital content may contain links to a snap-in provider server. If the consumer selects the digital content (step 810), the consumer is connected to the snap-in provider's server (812). Snap-in provider software 522 on snap-in provider server 330 listens for requests that include tracking information from host server 320. When the tracking information is identified, snap-in provider software 522 transmits the requested information and at the same time snap-in provider software 522 transmits the requested information and at the same time snap-in provider software 522 notifies service provider 340 of the request along with any additional selection activity (step 814). For example, by maintaining tracking information in a Uniform Resource Locator (URL), for each web page a consumer views at snap-in provider server 330, a web software notifies service provider server 340. Additionally, if a consumer purchases an item through snap-in provider server 330, snap-in provider server 330 notifies service provider server 340 as well.

Alternatively, or additionally, the tracking information may be embedded within a file local to the consumer, or cookies, and later read by a software when that consumer connects to snap-in provider server 330.

Trading Process

Figure 9:
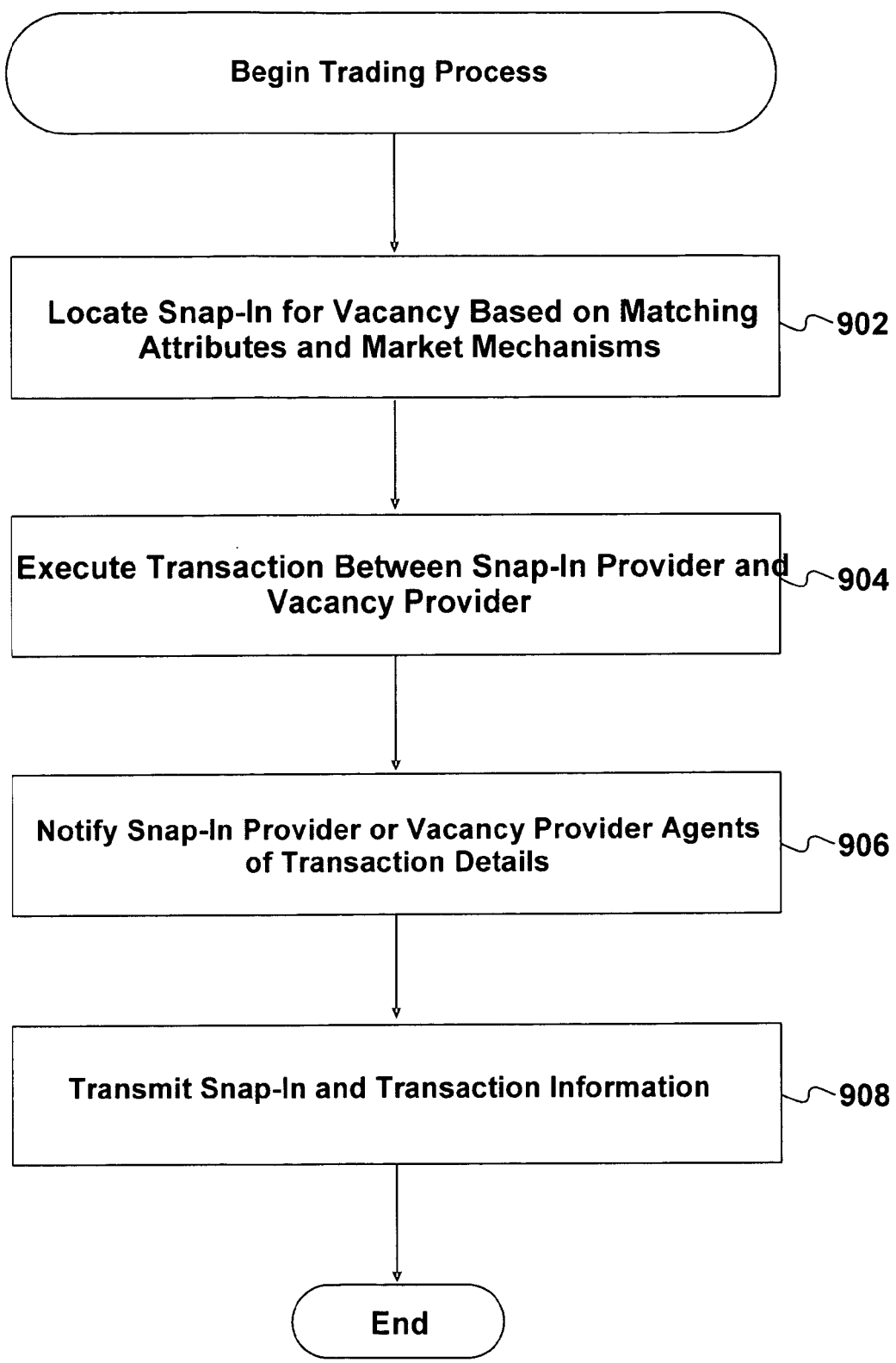
FIG. 9 depicts a flow chart of the steps performed by the data processing system when inserting a snap-in into a vacancy, according to an embodiment of the present invention.

As shown in FIG. 9, trading process is initiated by locating a snap-in for a vacancy based on matching attributes and/or market mechanisms (step 902). Trading engine 542 compares attributes for a vacancy with those of a snap-in. A vacancy may be seeking syndicated content, whereas a snap-in may be a particular type of syndicated content. A market mechanism is any type of method (e.g., buy, sell, or barter) used to locate snap-ins and vacancies. For example, trading engine 542 may use a Vickrey auction. The Vickrey auction allows a content provider to adjust their bidding strategy after each round. One skilled in the art will appreciate that other methods may be used, such as second price field bid auctions. Alternatively, or additionally, static trading may be used in that preset snap-in fills a preset vacancy. That is, the vacancy may indicate that only predetermined snap-ins (e.g., content from company "X") may be used to fill the vacancy. In a static system, service provider server 340 may serve as an auditing server, providing statistical information regarding how many times the preset snap-in has filled the vacancy.

Regardless of the market mechanism used to locate snap-ins and vacancies, trading engine 542 executes transactions between snap-in providers and vacancy providers (step 904).

For example, trading engine 542 may execute transactions using software agents to determine which among the eligible Strap-ins will be placed in the vacancy in real-lime. A software agent may be programmed to increase the price per impression up to a predetermined amount. Thus, if the initial bid (e.g., 5 cents) is a failed transaction, the software agent may be programmed to increase the price per impression (e.g., 15 cents). One skilled in the art will appreciate that the software agents may work with other parameters, such as number of units, geographic location, or attributes, such as size of a region, or audio length of the region. One skilled in the art will appreciate that other methods may be used to create winning strategies, such as neural network based agents, or rule based induction learning.

Once a transaction has been executed, trading engine 542 notifies snap-in provider (secondary content provider) as well as vacancy provider (primary content provider) of the transaction details (step 906). Trading engine 542 may also notify the respective agents of the providers. For example, trading engine 542 may notify an agent to increase the bid in a next transaction. Both vacancy providers and snap-in providers may indicate maximum bid level. One skilled in the art will appreciate that trading engine 542 may also directly notify the providers of the failed transaction. In this case, the provider may determine how to handle future transactions.

Once a snap-in has been selected for the vacancy, trading engine 542 transmits snap-in information and vacancy information to host software 504 (step 908), which in turn notifies the adapter software 508, which in turn merges the content. For example, the notification may include a URL link to the digital content, or the actual digital content. The URL link may also include additional tracking information. That is, the URL link may contain parameters used by the snap-in provider web site to information service provider server 340. Each time the consumer visits different snap-in provider web pages, the URL link may be used to transmit information to service provider server 340 so that service provider server 340 obtains a complete record of the consumer's activity at the snap-in provider web site. Thus, when a consumer clicks on the digital content in the vacancy and is connected to the snap-in providers web site, service provider server 340 may still track the consumer activity.

Alternatively, trading engine 542 may simply provide host server 320 with the actual digital content. For example, if the snap-in provider included with the snap-in a GIF image (e.g., a banner advertisement), instead of a URL link, the GIF image is forwarded to host server 320 for display. Also at this point, trading engine 542 may log the completed transaction and debit or credit the snap-in provider and host and appropriate amount.

Figure 11:
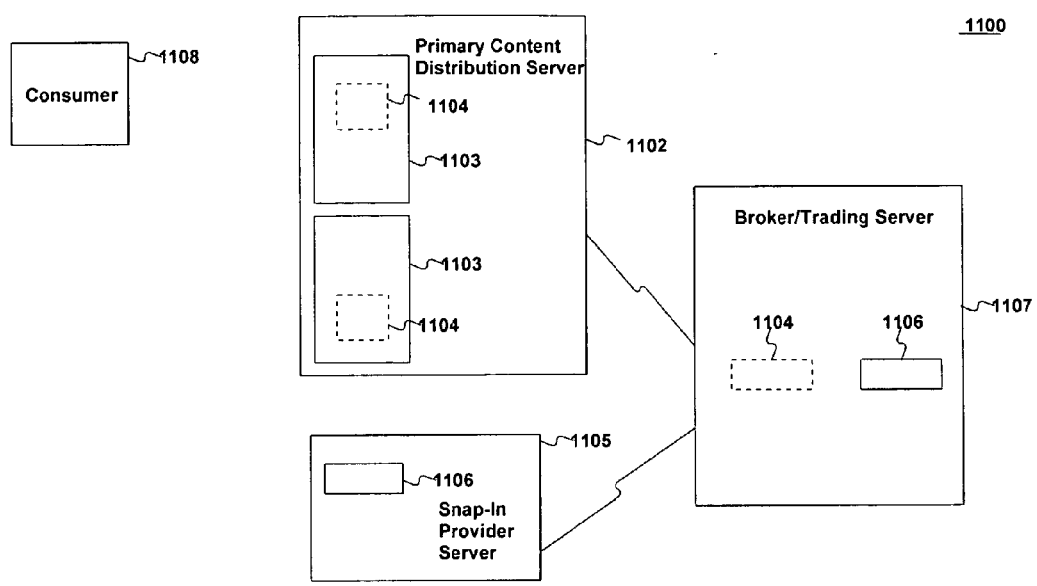
FIG. 11 depicts an example embodiment suitable for methods and systems consistent with embodiments of the present invention.

FIG. 11 depicts an advertising system 1100 consistent with the present invention. System 1100 contains a primary content distribution server 1102 capable or generating additional revenue from vacancies 1104 on containers 1103. Snap-in provider sewer 1105 contains snap-in 1106 created to fill vacancies 1104. Broker/Trading server 1107 matches vacancies 1104 with snap-in 1106.

A primary digital content provider may use a vacancy editor software to graphically define vacancy 1104 in container 1103. The provider also defines the vacancy's properties, such as the availability of units of 10,000 impressions for sale in December only, at a price of 4 cents per impression, keywords typed by a consumer in real-time, such as "teenager." The provider then uses the host software to submit vacancy 1104 to broker/trading server 1107. When consumer traffic increases at primary content distribution server 1102, the host software notifies broker/trading server 1107 of the increased traffic and to update the dynamic properties of vacancy 1104.

A secondary digital content provider may use a snap-in editor software, such as a web wizard, to designate specific snap-ins 1106 to be delivered to specific consumer profiles. The snap-in may be a banner advertisement, a virtual storefront, or any other digital content. The digital content provider may also use the appropriate software to indicate a preference for teenage consumers during peak web traffic for a snap-in 1106. Each time a consumer 1108 requests a container 1103 with vacancy 1104, the host software notifies broker/trading server 1107, which initiates a suitable trade. Broker/Trading server 1107 matches snap-in 1106 with vacancy 1104 (described above), and then transmits the snap-in to primary content distribution server 1102. The adapter software then merges the content with the vacancy 1104. Primary content distribution server 1102 transmits container 1103 with snap-in 1106 in place of vacancy 1104.

The primary content provider immediately receives revenue form secondary digital content providers who have created the snap-in 1106.

Alternative Content Distribution System

FIG. 12 depicts an alternative content distribution system suitable for practicing methods and systems consistent with the present invention. FIG. 12 illustrates a network 1260 that contains a vacancy provider 1262 (the primary content distributor), a vacancy/snap-in providers 1264, and a service provider with a broker/trading engine 1266. Content distributor 1262 communicates with content consumers, such as mobile devices 1290, through communication infrastructure 1280. For example, as part of the process in which vacancy provider (and primary content distributor) 1262 broadcast content to mobile devices 1290, adapter 1268 detects the vacancy and notifies the service provider 1266 via host software 1267. Service provider 1266 obtains suitable matching content from snap-in content provider 1264 and transmits the snap-in to adapter 1268 at the vacancy provider. Adapter 1268 merges the snap-in content with the primary distributor's content in a format understandable to mobile device 1290 (such as mobile IP, or PCS) and then transmits the content.

The operation of system 1260 is substantially the same as that described above except for the adapter software which is specialized to this distribution method, and the output device for receiving digital content, which in this example is a mobile device. A similar configuration may be used to provide digital content in a manner consistent with the present invention to other output devices like televisions and radios.

CONCLUSION

As explained, systems consistent with the present invention overcome the shortcoming of existing systems by providing a virtual marketplace that matches a unit of secondary digital content (snap-in) with a defined (vacancy) within primary content, such as a web site.

Although aspects of the present invention are described as being stored in memory, one skilled in the art will appreciate that these aspects may be stored on or read from other computer readable media, such as secondary storage devices, like hard disks, floppy disks, and CD-ROM; a carrier wave received from a network like the Internet, or other forms of ROM or RAM. Additionally, although specific components and programs of consumer computer 110, and various servers have been described, one skilled in the art will appreciate that these may contain additional or different components or programs.

The foregoing description of an implementation of the invention has been presented for purposes of illustration and description. It is not exhaustive and does not limit the invention to the precise form disclosed. Modifications and variations are possible in light of the above teaching or may be acquired from practicing the invention. For example, vacancies and objects may be represented as objects including methods and functions. Moreover, the described implementation includes software but the present invention may be implemented as a combination of hardware and software or in hardware alone. The invention may be implemented with both object-oriented and non-object-oriented programming systems.

What is claimed is:

1. A system for targeting digital video advertisements to consumers, the system comprising:
   a) at least one first server comprising a first connector, wherein the at least one first server is connected to at least one consumer device over a network and is configured to transmit a digital video program to the at least one consumer device through the first connector and over the network, wherein at least one vacancy is associated with the digital video program;
   b) at least one second server comprising:
      at least one storage device for storing a plurality of digital video advertisements, wherein at least one of the digital video advertisements has at least one attribute; and
      a second connector, wherein the at least one second server is connected to the at least one consumer device through the second connector;
   c) at least one first processor configured to select at least one of the digital video advertisements from the plurality of digital video advertisements, wherein the selection is based on comparing targeted criteria associated with the consumer to the at least one attribute of the at least one of the digital video advertisements; and
   d) at least one consumer device comprising:
      a third and fourth connector, wherein the at least one consumer device is configured to receive the digital video program through the third connector and the selected advertisement through the fourth connector; and
      at least one second processor configured to insert the selected advertisement into the digital video program,
   wherein the at least one second server is configured to transmit the selected advertisement to the at least one consumer device through the second connector.

2. The system of claim 1, wherein the at least one consumer device is a set top box.

3. The system of claim 2, wherein the targeted criteria comprises at least one of a consumer profile and contextual content.

4. The system of claim 3, wherein the at least one second server comprises the at least one first processor.

5. The system of claim 3, wherein the at least one first processor is configured to obtain demographic information using at least one of a network address of the consumer and a profile of the consumer.

6. The system of claim 3, wherein the selection is based on a bidding process.

7. The system of claim 3, wherein the at least one first processor is further configured to use demographic information for selecting the at least one of the digital video advertisements.

8. The system of claim 7, wherein the demographic information includes at least one of age and physical location.

9. The system of claim 2, wherein the at least one second processor is configured to insert the selected advertisement into the at least one vacancy in real time.

10. The system of claim 2, wherein the network comprises a packet network; and wherein the at least one second server is connected to the at least one consumer device over the network and is configured to transmit the selected advertisement to the at least one consumer device over the network.

11. The system of claim 10, wherein the at least one consumer device is configured to (a) receive the digital video program and the selected advertisement from the packet network in real time and (b) insert the selected advertisement into the digital video program at a designated time during the digital video program.

12. A system for targeting digital video advertisements to consumers, the system comprising:
a) at least one first server comprising a first connector, wherein the at least one first server is connected to at least one consumer device over a network and is configured to transmit a digital video program to the at least one consumer device through the first connector and over the network;
b) at least one second server comprising:
at least one storage device for storing a plurality of digital video advertisements, wherein at least one of the digital video advertisement has at least one attribute; and
a second connector, wherein the at least one second server is connected to the at least one consumer device;
c) at least one first processor configured to select at least one of the digital video advertisements from the plurality of digital video advertisements, wherein the selection is based on comparing demographic information to the at least one attribute of the at least one of the digital video advertisements; and
d) at least one consumer device comprising:
at least one third connector, wherein the at least one consumer device is configured to receive the digital video program and the selected advertisement through the at least one third connector; and
at least one second processor configured to insert the selected advertisement during the digital video program;
wherein the at least one second server is configured to transmit the selected advertisement to the at least one consumer device through the second connector.

13. The system of claim 12, wherein the network comprises a packet network; and wherein the at least one second server is connected to the at least one consumer device over the network and is configured to transmit the selected advertisement to the at least one consumer device over the network.

14. The system of claim 12, wherein the at least one third connector comprises one connector for receiving the digital video program and another connector for receiving the selected advertisement.

15. The system of claim 14, wherein the at least one second server comprises the at least one first processor.

16. The system of claim 14, wherein the at least one consumer device is a set top box.

17. The system of claim 16, wherein the selection is based on a bidding process.

18. The system of claim 17, wherein the at least one second processor is configured to insert the selected advertisement into the digital video program at a designated time during the digital video program.

19. The system of claim 16, wherein the demographic information includes at least one of age and physical location.

20. The system of claim 12, wherein the at least one first processor is configured to obtain the demographic information using at least one of a network address of the consumer and a profile of the consumer.

21. A system for providing video advertisements to a consumer, the system comprising:
at least one first server comprising a first connector, wherein the at least one server is connected to at least one consumer device over a network and is configured to transmit a digital video program to the at least one consumer device through the first connector and over the network;
at least one consumer device comprising:
at least one second connector, wherein the at least one consumer device is configured to receive, through the at least one second connector, the digital video program and the digital video advertisements; and
at least one processor configured to insert digital video advertisements into the digital video program;
wherein the at least one processor is configured to insert at least one of the digital video advertisements during the digital video program as the result of a selection of the at least one of the digital video advertisements based on demographic information associated with the consumer and at least one attribute of the at least one of the digital video advertisements.

22. The system of claim 21, wherein the at least one consumer device is a set top box.

23. The system of claim 22, further comprising at least one second server; wherein the at least one consumer device is configured to receive (1) the digital video program from the at least one first server through the at least one second connector; and (2) digital video advertisements from the at least one second server through the at least one second connector.

24. The system of claim 22, wherein at least one of the digital video advertisements is selected for transmission to the at least one consumer device based on comparing targeted criteria to the at least one attribute of the at least one of the digital video advertisements.

25. The system of claim 24, wherein the targeted criteria comprises at least one of a consumer profile and contextual content.

26. The system of claim 24, wherein the targeted criteria comprises the demographic information.

27. The system of claim 22, wherein the demographic information includes at least one of age and physical location.

28. The system of claim 22, wherein the system is configured to select at least one of the digital video advertisements for insertion by the at least one processor into the digital video program based on the demographic information associated with the consumer and at least one attribute of at least one of the digital video advertisements.

29. The system of claim 28, wherein the selection is based on a bidding process.

30. The system of claim 22, wherein the at least one processor of the at least one consumer device is configured to insert the selected at least one of the digital video advertisements into the digital video program in real time and at a designated time during the digital video program.

31. The system of claim 22, further comprises at least one second server, wherein the at least one consumer device is configured to receive (1) the digital video program from the at least one first server through one of the at least one second connector; and (2) digital video advertisements from the at least one second server through another of the at least one second connector.

32. The system of claim 22, wherein the selection is made in response to receiving a request from a consumer to obtain the digital video program.

33. The system of claim 22, wherein the system is configured such that the digital video program and the digital video advertisements are transmitted to the at least one consumer device through a primary content distributor.

34. The system of claim 22, wherein the system is configured to obtain demographic information using at least one of a network address of the consumer and a profile of the consumer.

35. The system of claim 22, wherein at least one attribute of the digital video program is used to identify available digital video advertisements for providing to the at least one consumer device.

36. The system of claim 22, wherein the digital video program comprises at least one vacancy and at least one processor is configured to insert the selected at least one of the digital video advertisements into the at least one vacancy of the digital video program.

37. The system of claim 21, further comprising at least one second server; wherein the at least one consumer device is configured to receive (1) the digital video program from the at least one first server through the at least one second connector; and (2) digital video advertisements from the at least one second server through the at least one second connector.

38. The system of claim 21, wherein at least one of the digital video advertisements is selected for transmission to the at least one consumer device based on comparing targeted criteria to the at least one attribute of the at least one of the digital video advertisements.

39. The system of claim 38, wherein the targeted criteria comprises at least one of a consumer profile and contextual content.

40. The system of claim 38, wherein the targeted criteria comprises the demographic information.

41. The system of claim 21, wherein the demographic information includes at least one of age and physical location.

42. The system of claim 21, wherein the selection is based on a bidding process.

43. The system of claim 21, wherein the at least one processor of the at least one consumer device is configured to insert the selected at least one of the digital video advertisements into the digital video program in real time and at a designated time during the digital video program.

44. The system of claim 21, further comprises at least one second server, wherein the at least one consumer device is configured to receive (1) the digital video program from the at least one first server through one of the at least one second connector; and (2) digital video advertisements from the at least one second server through another of the at least one second connector.

45. The system of claim 21, wherein the selection is made in response to receiving a request from a consumer to obtain the digital video program.

46. The system of claim 21, wherein the system is configured such that the digital video program and the digital video advertisements are transmitted to the at least one consumer device through a primary content distributor.

47. The system of claim 21, wherein the system is configured to obtain demographic information using at least one of a network address of the consumer and a profile of the consumer.

48. The system of claim 21, wherein at least one attribute of the digital video program is used to identify available digital video advertisements for providing to the at least one consumer device.

49. The system of claim 21, wherein the digital video program comprises at least one vacancy and at least one processor is configured to insert the selected at least one of the digital video advertisements into the at least one vacancy of the digital video program.

50. A system for targeting digital video advertisements to consumers, the system comprising:
   a) at least one first server comprising a first connector, wherein the at least one first server is connected to at least one of a computer or mobile device over a network and is configured to transmit a digital video program to the at least one consumer device through the first connector and over the network;
   b) at least one second server comprising:
      at least one storage device for storing a plurality of digital video advertisements, wherein at least one of the digital video advertisements has at least one attribute; and
      a second connector, wherein the at least one second server is connected to the at least one consumer device over the network; and
   c) at least one first processor configured to select at least one of the digital video advertisements from the plurality of digital video advertisements, wherein the selection is based on comparing targeted criteria associated with the consumer to the at least one attribute of the at least one digital video advertisements;
   wherein the at least one second server is configured to transmit the selected digital video advertisements to the at least one of a computer or mobile device through the second connector and over the network for insertion of the selected digital video advertisements into the digital video program at one or more designated times during the digital video program.

* * * * *